(12) United States Patent
Lee et al.

(10) Patent No.: US 10,971,753 B2
(45) Date of Patent: Apr. 6, 2021

(54) NEGATIVE ELECTRODE FOR LITHIUM METAL BATTERY, METHOD OF PREPARING NEGATIVE ELECTRODE, AND LITHIUM METAL BATTERY INCLUDING THE SAME

(71) Applicants: Samsung Electronics Co., Ltd., Suwon-si (KR); Samsung SDI Co., Ltd., Yongin-si (KR)

(72) Inventors: Yonggun Lee, Yongin-si (KR); Saebom Ryu, Suwon-si (KR); Yooseong Yang, Yongin-si (KR); Toshinori Sugimoto, Hwaseong-si (KR); Taehwan Yu, Seoul (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 189 days.

(21) Appl. No.: 15/964,157

(22) Filed: Apr. 27, 2018

(65) Prior Publication Data
US 2018/0316051 A1 Nov. 1, 2018

(30) Foreign Application Priority Data

Apr. 28, 2017 (KR) .................. 10-2017-0055755
Apr. 25, 2018 (KR) .................. 10-2018-0048017

(51) Int. Cl.
*H01M 10/0525* (2010.01)
*H01M 4/1395* (2010.01)
(Continued)

(52) U.S. Cl.
CPC ......... *H01M 10/0525* (2013.01); *H01M 2/14* (2013.01); *H01M 2/166* (2013.01);
(Continued)

(58) Field of Classification Search
CPC ........... H01M 10/0525; H01M 10/056; H01M 10/0585; H01M 10/052; H01M 10/0569;
(Continued)

(56) References Cited

U.S. PATENT DOCUMENTS

| 9,225,036 B2 | 12/2015 | Chang et al. | |
| 2005/0095504 A1* | 5/2005 | Kim | H01M 4/38 |
| | | | 429/246 |

(Continued)

FOREIGN PATENT DOCUMENTS

| EP | 3065202 A1 | 9/2016 |
| EP | 3076470 A1 | 10/2016 |

(Continued)

OTHER PUBLICATIONS

Choudhury et al., "A highly reversible room-temperature lithium metal battery based on crosslinked hairy nanoparticles", Nature Communications, 2015—1-9.

(Continued)

*Primary Examiner* — Laura Weiner
(74) *Attorney, Agent, or Firm* — Cantor Colburn LLP

(57) ABSTRACT

A negative electrode for a lithium metal battery, the negative electrode including: a lithium metal layer including lithium metal or a lithium metal alloy; and a protective layer on at least a portion of the lithium metal layer, wherein the protective layer includes a plurality of composite particles having a particle size of greater than about 1 micrometer to about 100 micrometers or less, wherein a composite particle of the plurality of composite particles comprises a particle comprising an organic particle, an inorganic particle, an organic-inorganic particle, or combination thereof; and a coating layer disposed on at least a portion of a surface of the particle, the coating layer including an ion conductive material including an ion conductive oligomer including an ion (Continued)

conductive unit, an ion conductive polymer including an ion conductive unit, or a combination thereof.

24 Claims, 22 Drawing Sheets

(51) Int. Cl.

| | | |
|---|---|---|
| H01M 4/62 | (2006.01) | |
| H01M 4/134 | (2010.01) | |
| H01M 2/14 | (2006.01) | |
| H01M 10/0569 | (2010.01) | |
| H01M 2/16 | (2006.01) | |
| H01M 4/38 | (2006.01) | |
| H01M 10/056 | (2010.01) | |
| H01M 4/40 | (2006.01) | |
| H01M 10/0585 | (2010.01) | |
| H01M 10/052 | (2010.01) | |
| H01M 4/02 | (2006.01) | |
| H01M 10/0565 | (2010.01) | |
| H01M 10/0562 | (2010.01) | |

(52) U.S. Cl.
CPC ....... *H01M 2/1646* (2013.01); *H01M 2/1653* (2013.01); *H01M 2/1673* (2013.01); *H01M 4/134* (2013.01); *H01M 4/1395* (2013.01); *H01M 4/382* (2013.01); *H01M 4/405* (2013.01); *H01M 4/621* (2013.01); *H01M 10/052* (2013.01); *H01M 10/056* (2013.01); *H01M 10/0569* (2013.01); *H01M 10/0585* (2013.01); *H01M 10/0562* (2013.01); *H01M 10/0565* (2013.01); *H01M 2004/027* (2013.01); *H01M 2004/028* (2013.01); *H01M 2300/0065* (2013.01)

(58) Field of Classification Search
CPC ......... H01M 10/0565; H01M 10/0562; H01M 4/382; H01M 4/405; H01M 4/1395; H01M 4/621; H01M 4/134; H01M 4/366; H01M 4/624; H01M 4/628; H01M 2/1646; H01M 2/166; H01M 2/1673; H01M 2/1653; H01M 2/14; H01M 2300/0065; H01M 2004/028; H01M 2004/027

See application file for complete search history.

(56) References Cited

U.S. PATENT DOCUMENTS

| | | | |
|---|---|---|---|
| 2010/0248026 A1* | 9/2010 | Hinoki | H01M 4/366 |
| | | | 429/209 |
| 2011/0274983 A1 | 11/2011 | Yontz et al. | |
| 2015/0255767 A1 | 9/2015 | Aetukuri et al. | |
| 2016/0351956 A1 | 12/2016 | Lee et al. | |
| 2017/0317352 A1* | 11/2017 | Lee | H01M 4/366 |
| 2017/0324097 A1* | 11/2017 | Lee | H01M 4/382 |
| 2018/0166743 A1 | 6/2018 | Lee et al. | |

FOREIGN PATENT DOCUMENTS

| | | |
|---|---|---|
| EP | 3136475 A1 | 3/2017 |
| EP | 3157079 A1 | 4/2017 |
| KR | 101054745 B1 | 8/2011 |
| KR | 1020130000662 A1 | 1/2013 |
| KR | 101460282 B1 | 11/2014 |
| KR | 101663411 B1 | 9/2016 |
| KR | 1020160140211 A | 12/2016 |

OTHER PUBLICATIONS

Schaefer et al., "High Lithium Transfererence Number Electrolytes via Creation of 3-Dimensional, Charged, Nanoporous Networks from Dense Functionalized Nanoparticle Composites", Chemistry of Materials, 25, 20113, 834-839.

Shim et al., "Polymer Composite Electrolytes Having Core-Shell Silica Fillers with Anion-Trapping Baron Moiety in the Shell Layer for All-Solid-State Lithium-Ion Batteries", Applied Materials & Interfaces, 7, 2015, 7690-7701.

Srivastava et al., "25th Anniversary Article: Polymer-Particle Composites: Phase Stability and Applications in Electrochemical Energy Storage", Advanced Materials, 26, 2014, 201-234.

European Search Report for European Patent Application No. 18169545.3 dated Jun. 29, 2018.

* cited by examiner

NEGATIVE ELECTRODE FOR LITHIUM METAL BATTERY, METHOD OF PREPARING NEGATIVE ELECTRODE, AND LITHIUM METAL BATTERY INCLUDING THE SAME

CROSS-REFERENCE TO RELATED APPLICATION

This application claims priority to and the benefit of Korean Patent Application No. 10-2017-0055755, filed on Apr. 28, 2017, and 10-2018-0048017, filed on Apr. 25, 2018, in the Korean Intellectual Property Office, and all the benefits therefrom under 35 U.S.C. § 119, the content of which is incorporated herein in its entirety by reference.

BACKGROUND

1. Field

The present disclosure relates to a negative electrode for a lithium metal battery, a method of preparing the negative electrode, and a lithium metal battery including the negative electrode.

2. Description of the Related Art

Lithium secondary batteries are high-performance batteries having the highest energy density as compared with other types of commercially available secondary batteries, and are applicable to various fields including, for example, electric vehicles.

A lithium secondary battery may use a lithium metal thin film as a negative electrode. When a lithium metal thin film is used as the negative electrode, the negative electrode may strongly react with the liquid electrolyte during charge or discharge of the battery due to the high reactivity between the lithium metal and the electrolyte. In addition, dendritic growth may occur on the lithium metal thin film negative electrode. Accordingly, a lithium secondary battery including a lithium metal thin film may have reduced lifespan and stability. Therefore, there is a need for a lithium secondary battery having improved properties.

SUMMARY

Provided is a negative electrode for a lithium metal battery and a method of preparing the negative electrode, wherein the negative electrode includes a protective layer.

Provided is a lithium metal battery having improved cell performance and including the negative electrode.

Provided is a composite electrolyte for a lithium metal battery.

Additional aspects will be set forth in part in the description which follows and, in part, will be apparent from the description, or may be learned by practice of the presented embodiments.

According to an aspect of an embodiment, a negative electrode for a lithium metal battery includes: a lithium metal layer including lithium metal or a lithium metal alloy; and a protective layer on at least a portion of the lithium metal layer, wherein the protective layer includes a plurality of composite particles having a particle size of greater than about 1 micrometer to about 100 micrometers or less, wherein a composite particle of the plurality of composite particles includes a particle including an organic particle, an inorganic particle, an organic-inorganic particle, or combination thereof; and a coating layer disposed on at least one portion of the particle, the coating layer including an ion conductive material including an ion conductive oligomer including an ion conductive unit, an ion conductive polymer including an ion conductive unit, or a combination thereof.

According to an aspect of another embodiment, a lithium metal battery includes a positive electrode; the negative electrode; and an electrolyte disposed between the positive electrode and the negative electrode.

The electrolyte may include a composite particle, wherein the composite particle includes a particle and a coating layer disposed on the particle and including an ion conductive material including an ion conductive oligomer including an ion conductive unit, an ion conductive polymer including an ion conductive unit, or a combination thereof, wherein the particle includes an organic particle, an inorganic particle, an organic-inorganic particle, or a combination thereof, each having a particle size of greater than about 1 micrometer to about 100 micrometers or less.

According to an aspect of another embodiment, a composite electrolyte includes a plurality of composite particles, wherein a composite particle of the plurality of composite particles includes a particle and a coating layer disposed on at least a portion of the particle and including an ion conductive material including an ion conductive oligomer including an ion conductive unit, an ion conductive polymer including an ion conductive unit, or a combination thereof, and wherein the particle includes an organic particle, an inorganic particle, an organic-inorganic particle, or a combination thereof, having a particle size of greater than about 1 μm and about 100 μm or less.

According to an aspect of another embodiment, a lithium metal battery includes a positive electrode; a lithium metal negative electrode including lithium metal or a lithium metal alloy; and the composite electrolyte disposed between the positive electrode and the lithium metal negative electrode.

According to an aspect of another embodiment, a method of manufacturing a negative electrode for a lithium metal battery includes: mixing a composite particle with a solvent to form a protective layer-forming composition; coating the protective layer-forming composition on a lithium metal layer; and drying the protective layer-forming composition to form a protective layer to thereby manufacture the negative electrode for the lithium metal battery, wherein the composite particle includes a particle, and a coating layer disposed on at least a portion of the particle and including an ion conductive material comprising an ion conductive oligomer comprising an ion conductive unit, an ion conductive polymer including an ion conductive unit, or a combination thereof, wherein the particle includes an organic particle, an inorganic particle, an organic-inorganic particle, or a combination thereof, having a particle size of greater than about 1 micrometer to about 100 micrometers or less.

The method may further include mixing a polymerizable oligomer with a solvent to form a polymerizable oligomer composition, and coating the polymerizable oligomer composition on the coated and dried protective layer; and after the coating and drying of the protective layer-forming composition on the lithium metal layer, crosslinking to form a protective layer.

BRIEF DESCRIPTION OF THE DRAWINGS

These and/or other aspects will become apparent and more readily appreciated from the following description of the embodiments, taken in conjunction with the accompanying drawings in which:

FIGS. 7A to 7C illustrate the results of lithium deposition simulation performed in Evaluation Example 5 in which FIGS. 7B and 7C are each a graph of total lithium ion current density (−liion.itot, amperes per square meter (A/m$^2$)) versus x-coordinate;

DETAILED DESCRIPTION

Figure 1A:
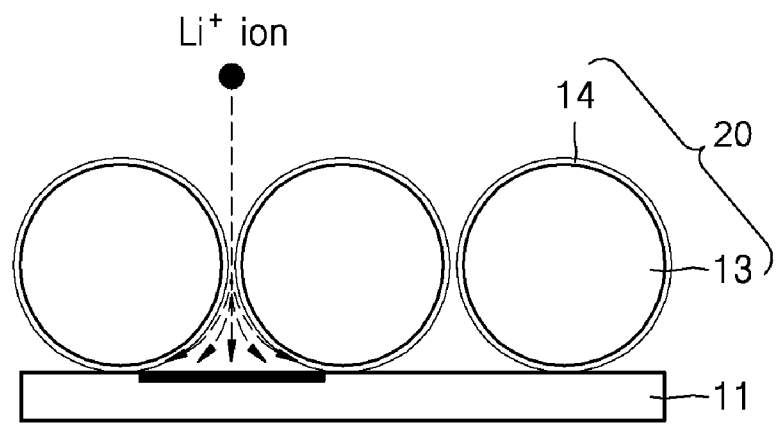
FIG. 1A is a schematic view illustrating an embodiment of a theoretical principle of a negative electrode for a lithium metal battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Reference will now be made in detail to example embodiments of a negative electrode for a lithium metal battery, a lithium metal battery including the negative electrode, and a composite electrolyte for a lithium metal battery, examples of which are illustrated in the accompanying drawings.

Provided is a negative electrode for a lithium metal battery, the negative electrode comprising a lithium metal layer including lithium metal or a lithium metal alloy; and a protective layer on at least a portion of the lithium metal layer, wherein the protective layer includes a plurality of composite particles having a particle size of greater than about 1 micrometer to about 100 micrometers or less wherein a composite particle of the plurality of composite particles comprises a particle comprising an organic particle, an inorganic particle, an organic-inorganic particle, or combination thereof; and a coating layer disposed on at least a portion of a surface of the particle, the coating layer comprising an ion conductive material comprising an ion conductive oligomer comprising an ion conductive unit, an ion conductive polymer comprising an ion conductive unit, or a combination thereof. The composite particle, may include an organic particle, an inorganic particle, an organic-inorganic particle, or a combination thereof, and in an embodiment, each composite particle has a particle size of greater than about 1 micrometer ($\mu$m) to about 100 $\mu$m or less, for example, about 5 $\mu$m to about 75 $\mu$m. The protective layer has a Young's modulus of about $10^6$ Pascals (Pa) or greater, e.g., about $10^6$ Pa to about $10^9$ Pa, or about $5 \times 10^6$ Pa to about $5 \times 10^8$ Pa.

The composite particles may have an interconnected structure.

The term "interconnected" as used herein means that composite particles are physically and/or chemically connected and/or bound to one another. The term "interconnected" means connected and/or bound via, e.g., a crosslink.

The lithium metal or a lithium metal alloy has a relatively high electric capacity per unit weight, and thus may be used to implement a high-capacity battery. However, using such a lithium metal or lithium metal alloy may cause dendritic growth during the deposition/dissolution of lithium ions, and consequently results in a short circuit between the positive and negative electrodes. An electrode including a lithium metal or lithium metal alloy may be highly reactive with the electrolyte, and thus may result in side reactions between lithium metal or lithium metal alloy and the electrolyte. Due to these side reactions, the cycle lifespan of a battery may be reduced. To address this drawback, a protective layer, which protects the lithium metal surface of the electrode including the lithium metal or lithium metal alloy, has been developed.

Disclosed is a protective layer for a lithium metal battery, which may address this drawback. A protective layer may include, on the surface of interconnected particles which constitute the protective layer, a coating layer including an ion conductive material disposed on at least one portion of each particle. Thus, the lithium metal battery including the protective layer may have improved uniform current density and mechanical properties upon lithium deposition. The protective layer for a lithium metal battery may have further improved uniform current density at a high rate.

FIG. 1A is a schematic view illustrating a structure of an embodiment of a negative electrode for a lithium metal battery.

As shown in FIG. 1A, a protective layer may be formed on a lithium metal layer 11 including lithium metal or lithium metal alloy, and the protective layer may include interconnected particles 13. On the particle 13, a coating layer 14 may be disposed, which may include at least one ion conductive material, which may comprise an ion conductive oligomer including an ion conductive unit, an ion conductive polymer including an ion conductive unit, or a combination thereof. As shown in FIG. 1A, the coating layer 14 may be formed either as a continuous layer or a non-continuous layer on the particles 13. The particle 13 may constitute a non-ionic conductive core, and the coating layer 14 may constitute an ion conductive shell. Thus, a composite particle 20 may have a core-shell microsphere structure. The arrows in FIGS. 1A and 1B represent the migrating direction of lithium ions.

Figure 1B:
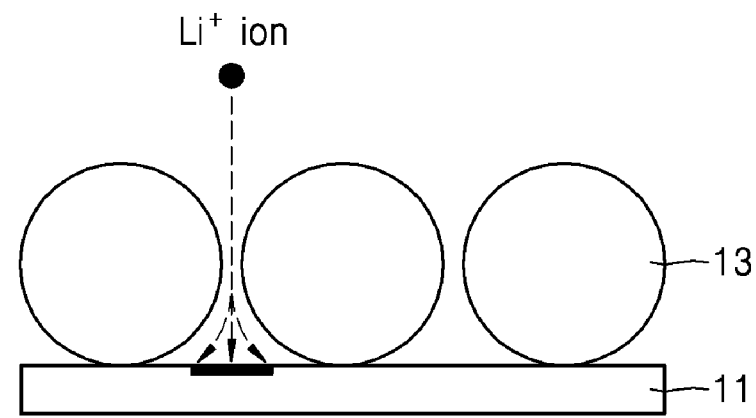
FIG. 1B is a schematic view illustrating an embodiment of a negative electrode in which a coating layer is not formed on a surface of a particle included in a protective layer, as compared with FIG. 1A.

As compared with a protective layer in FIG. 1B, in which a coating layer is not formed on the particle 13, in the protective layer in FIG. 1A, an ion conducting path may be formed along the surface of the coating layer 14, and lithium ions may migrate through micropores. As lithium ion conduction may occur along the surface of the coating layer 14 of the particle 13, sites on which lithium may be deposited are uniformly present on the surface of the lithium metal layer 11, and thus lithium deposition may occur evenly, as compared with the protective layer in which a coating layer is not formed on the surface of the particle 13. In addition, the interfacial resistance of the protective layer and the lithium metal layer 11 may reduce, thereby providing ion conductivity of the protective layer of about $10^{-3}$ Siemens per centimeter (S/cm), e.g., about $10^{-3}$ S/cm to about 10 S/cm, or about $5 \times 10^{-2}$ S/cm to about 1 S/cm, or greater at room temperature. The use of such a negative electrode effectively suppresses and uniformizes the volume change upon charging the battery.

In a protective layer according to an embodiment, particles may include a block copolymer, such as a styrene-divinylbenzene block copolymer, thus having an interconnected structure and improved alignment and dispersion characteristics.

In the ion conductive oligomer including an ion conductive unit and the ion conductive polymer including an ion conductive unit, the ion conductive unit may be a C1-C30 alkylene oxide group, —{Si(R)(R')—O—}$_b$—, or —(CH$_2$CH$_2$O)$_a$—{Si(R)(R')—O—}$_b$—, and R and R' may each independently be hydrogen or a C1-C10 alkyl group, a and b may each independently be an integer from 1 to 10, for example, an integer from 1 to 5. R and R' may be, for example, a methyl group, an ethyl group, a propyl group, or butyl group.

The at least one ion conductive material comprising the ion conductive oligomer including an ion conductive unit, the ion conductive polymer including an ion conductive unit, or a combination thereof, may be, for example, polyethylene glycol, polypropylene glycol, poly(ethylene glycol-co-propylene glycol-co-ethylene glycol), poly(propylene glycol-co-ethylene glycol-co-propylene glycol), polysiloxane, poly(oxyethylene)methacrylate (POEM), poly(ethylene glycol)diacrylate (PEGDA), poly(propylene glycol) diacrylate (PPGDA), poly(ethylene glycol) dimethacrylate (PEGDMA), poly(propylene glycol) dimethacrylate (PPGDMA), poly(ethylene glycol)urethane diacrylate, poly(ethylene glycol)urethane dimethacrylate, polyester diacrylate, polyester dimethacrylate, poly(ethylene glycol) urethane triacrylate, poly(ethylene glycol) urethane trimethacrylate, an oligomer derived from at least one particle selected from trimethylolpropane triacrylate, and trimethylolpropane trimethacrylate, a polymer derived from at least one particle selected from trimethylolpropane triacrylate, and trimethylolpropane trimethacrylate, poly(ethylene oxide) grafted poly(methyl methacrylate) (PEO grafted PMMA), poly(propylene oxide) grafted poly(methyl methacrylate) (PPO grafted PMMA), poly(butylene oxide) grafted poly(methyl methacrylate) (PBO grafted PMMA), polysiloxane grafted poly(methyl methacrylate) (polysiloxane grafted PMMA), poly(ethylene glycol) grafted poly(methyl methacrylate) (PEG grafted PMMA), and poly(propylene glycol) grafted poly(methyl methacrylate) (PPG grafted PMMA).

The ion conductive material may be, for example, polyethylene glycol, polypropylene glycol, poly(ethylene glycol-co-propylene glycol-co-ethylene glycol), poly(propylene glycol-co-ethylene glycol-co-propylene glycol), and polysiloxane.

The weight average molecular weight of the ion conductive material may be in a range of about 200 to about 100,000 Daltons, in some embodiments, about 200 to about 10,000 Daltons, in some embodiments, about 200 to about 5,000 Daltons, and in some embodiments, about 200 to about 600 Daltons. When the weight average molecular weight of the ion conductive material is within any of these ranges, the coating layer may likely be formed on the particle.

The thickness of the coating layer may be about 1 micrometer (μm) or less, in some embodiments, about 500 nanometers (nm) or less, in some embodiments, about 5 nm to about 500 nm, in some embodiments, about 10 nm to about 200 nm, and in some embodiments, about 20 nm to about 100 nm. When the thickness of the coating layer is within any of these ranges, lithium ions may migrate more freely in a negative electrode, and the current density may be highly uniform upon lithium deposition on a lithium metal layer.

In an embodiment, the amount of the ion conductive material in the coating layer of the protective layer may be in a range of about 10 parts to about 50 parts by weight, in some embodiments, about 10 parts to about 45 parts by weight, in some embodiments, about 10 parts to about 35 parts by weight, and in some embodiments, about 15 parts to about 30 parts by weight, based on 100 parts by weight of the particles. When the amount of the ion conductive material is within any of these ranges, the protective layer may have excellent mechanical strength, and thus may effectively suppress lithium dendritic growth, and the current density may be highly uniform upon lithium deposition on a lithium metal layer.

The ion conductive material may serve as a binder to help adhere the particles on the lithium metal layer in the protective layer. Any suitable material that may improve the mechanical strength of the protective layer may be used.

The conductivity of the ion conductive material in the coating layer may be 5 times or greater, in some embodiments, about 10 times or greater, in some embodiments, about 25 times or greater, and in some embodiments, about 100 times or greater, than the conductivity of materials in the remaining part of the protective layer except for the composite particles. The difference in conductivity may vary depending on the thickness of the coating layer.

When the thickness of the coating layer according to an embodiment is about 0.2 μm (200 nm), and the conductivity of the ion conductive material is about 25 times or greater, for example, about 25 times greater to about 100 times greater, or for example, about 25 times greater to about 89 times greater, than the conductivity of materials in the remaining part of the protective layer except for the composite particles, the negative electrode may have a more uniform current density.

When the thickness of the coating layer according to an embodiment is about 0.1 μm (100 nm), and the conductivity of the ion conductive material is about 50 times or greater, for example, about 50 times greater to about 100 times greater, or for example, about 50 times greater to about 89 times greater, than the conductivity of materials in the remaining part of the protective layer except for the particles, the negative electrode may have a more uniform current density.

In some embodiments, the protective layer may include a lithium salt or a liquid electrolyte.

When the protective layer includes a liquid electrolyte, the liquid electrolyte may form ion conducting paths so that the conductivity of the negative electrode may improve. Thus, a lithium metal battery having stable cycle characteristics may be manufactured using the negative electrode.

The liquid electrolyte may include an organic solvent, an ionic liquid, a lithium salt, or a combination thereof.

The liquid electrolyte may occupy about 30 percent by volume (vol %) to about 60 vol % of the total volume of the protective layer. For example, the liquid electrolyte may occupy about 35 vol % to about 55 vol %, based on a total volume of the protective layer. In some embodiments, the liquid electrolyte may occupy about 40 vol % to about 50 vol % of the total volume of the protective layer.

In some embodiments, at least one particle selected from an organic particle, an inorganic particle, and an organic-inorganic particle in the protective layer may have a particle size of about 1.1 μm to about 50 μm, for example, about 1.1 μm to about 25 μm, for example, about 1.3 μm to about 28 μm, for example, about 1.5 μm to about 20 μm, or for example, about 1.5 μm to about 10 μm.

In some embodiments, the particle in the protective layer may be, for example, an organic particle.

An inorganic particle may have higher strength than an organic particle; however, the inorganic particle may require a binder in the preparation of the protective layer, and the resistance characteristics of the protective layer may be high, due to functional groups such as a hydroxyl group present on the surface of the inorganic particle, as compared with the protective layer including an organic particle.

In some embodiments, the particle may include a poly (styrene-co-divinylbenzene) copolymer microsphere having an average particle diameter of about 3 μm and a poly (styrene-co-divinylbenzene) copolymer microsphere having an average particle diameter of about 8 μm at a weight ratio of about 1:1. In some embodiments, the particle may include a poly(styrene-co-divinylbenzene) copolymer microsphere having an average particle diameter of about 3 μm and a poly(styrene-co-divinylbenzene) copolymer microsphere having an average particle diameter of about 1.3 μm at a weight ratio of about 1:1. In some embodiments, the particle may include a poly(styrene-co-divinylbenzene) copolymer microsphere having an average particle diameter of about 3 μm and a poly(styrene-co-divinylbenzene) copolymer microsphere having an average particle diameter of about 1.1 μm at a weight ratio of about 1:1.

According to an embodiment, the particle may be a microsphere having a mono-modal particle diameter distribution. The mono-modal particle diameter distribution may be defined by a standard deviation in a range of about 1% or greater to less than about 40%, for example, about 2% to about 25%, or for example, about 3% to about 10%, when analyzed by a particle diameter analyzer using light scattering, e.g., when analyzed using Nicomp 380 instrument.

In some embodiments, the protective layer may further include an ion conductive polymer, an ionic liquid, or a combination thereof, in addition to the composite particle, the lithium salt, and the liquid electrolyte.

The ion conductive polymer may be, for example, polyethylene oxide, polypropylene oxide, a polyethylene derivative, or poly(ethylene-co-vinyl acetate).

When the protective layer includes an ion conductive polymer, the amount of the particle in the composite particle may be in a range of about 1 part to about 100 parts by weight, for example, about 1 part to about 50 parts by weight, or for example, about 5 parts to about 30 parts by weight, based on 100 parts by weight of the ion conductive polymer.

When the protective layer further includes a lithium salt and an ion conductive polymer, the amount of the lithium salt may be in a range of about 1 part to about 100 parts by weight, for example, about 1 part to about 50 parts by weight, or for example, about 5 parts to about 30 parts by weight, based on 100 parts by weight of the ion conductive polymer.

When the protective layer further includes an ion conductive polymer and an ionic liquid, the amount of the ionic liquid may be in a range of about 1 part to about 100 parts by weight, for example, about 1 part to about 50 parts by weight, or for example, about 5 parts to about 30 parts by weight, based on 100 parts by weight of the ion conductive polymer.

Any suitable ionic liquid, lithium salt, and organic solvent used in a lithium metal battery may be used in the protective layer.

The protective layer may have a Young's modulus of about $10^6$ Pa or greater, for example, about $10^7$ Pa or greater, or about $10^8$ Pa or greater. For example, the protective layer may have a Young's modulus of about $10^6$ Pa to about $10^{11}$ Pa, about $10^7$ to about $10^{10}$ Pa, or about $10^7$ to about $10^9$ Pa. When the protective layer has a Young's modulus within any of these ranges, the protective layer may have improved tensile strength and mechanical properties.

The Young's modulus has the same meaning as a "tensile modulus." The tensile modulus of the protective layer may be measured using dynamic mechanical analysis system (DMA800; available from TA Instruments). Protective layer samples are prepared according to ASTM standard D412 (Type V specimens). Variations in strain with respect to stress in a protective layer sample are measured at a temperature of about 25° C., a relative humidity of about 30%, and a rate of 5 millimeters (mm) per minute, thereby to obtain a stress-strain curve. The tensile modulus of the protective layer is calculated from the slope of the stress-strain curve.

The measurement of a Young's modulus of a protective layer according to an embodiment may be facilitated by using the above-described method and equipment for measuring a Young's modulus of an isolated protective layer, which may be isolated from a battery, by one of ordinary skill in the art without undue experimentation.

The at least one particle in the protective layer may have a crosslinked structure. The particle having a chemically or physically crosslinked structure may include, for example, an organic particle of a crosslinked polymer obtained from a polymer having a crosslinkable functional group, an inorganic particle having a crosslinked structure due to a crosslinkable functional group on a surface thereof, or the like. The crosslinkable functional group, which is involved in a crosslinking reaction, may be, for example, an acryl group, a methacryl group, a vinyl group, or the like.

Crosslinking may be induced by heating or by irradiation with ultraviolet (UV) light. The heating or UV light irradiation may be performed so as not to adversely affect the lithium metal layer.

A particle having a chemically crosslinked structure refers to a particle in which crosslinking has occurred using chemical methods (e.g., using chemical reagents) to facilitate bonding of crosslinkable functional groups present in a material for forming the particle. A particle having a physically crosslinked structure refers to a particle in which crosslinking has occurred using physical methods. For example, the physical methods may include heating a polymer for forming the particle until it reaches its glass transition (Tg) temperature, in order to facilitate bonding of crosslinkable functional groups, i.e., crosslinks which are not formed using chemical reagents. The crosslinking may occur within the particle per se and may also occur between adjacent particles in the protective layer.

The lithium metal may have a thickness of about 100 μm or less, for example, about 80 μm or less, about 50 μm or less, about 30 μm or less, or about 20 μm or less. In some embodiments, the lithium metal may have a thickness in a range of about 0.1 μm to about 60 μm. For example, the lithium metal may have a thickness in a range of about 1 μm to about 25 μm, about 5 μm to about 20 μm, or about 10 μm to about 20 μm.

The shape of the particle in the protective layer may include a spherical shape, a rod shape, an elliptical shape, a radial shape, or a combination thereof.

When the particle in the protective layer has a spherical shape, the particle in the protective layer may be a microsphere having an average particle diameter of greater than about 1 μm to about 100 μm. For example, the microspheres may have an average particle diameter of about 1.5 μm to about 75 µm, about 1.5 µm to about 50 µm, about 1.5 µm to about 20 µm, or about 1.5 µm to about 10 µm.

In the case that the particle in the protective layer has a particle size greater than about 100 µm, the thicknesses of the protective layer and a lithium metal battery including the protective layer may both increase, which may result in low energy density of the lithium metal battery. Furthermore, when the protective layer is excessively thick, the protective layer may also have an increased porosity, and as a result the liquid electrolyte may be more likely to contact the lithium metal layer.

In an embodiment in which the particle in the protective layer has a particle size of about 1 µm or less, a lithium metal battery including the protective layer with such small particles may have poor lithium deposition density, as compared with a lithium metal battery having a protective layer including a particle having a particle size greater than about 1 µm and about 100 µm or less.

The term "size" or "particle size" as used herein may refer to an average particle diameter when the particle has a spherical shape. When the particle has a rod shape or an elliptical shape, the term "size" or "particle size" may refer to the length of a major axis. When the particle in the protective layer has a rod shape, a minor to major axis ratio of the particle may be, for example, about 1:1 to about 1:30, for example, about 1:2 to about 1:25, or for example, about 1:5 to about 1:20.

The term "average particle size" or "average particle diameter", or "D50 particle size," as used herein, refers to a particle diameter corresponding to 50% of the particles in a distribution curve in which particles are accumulated in the order of particle diameter from the smallest particle to the largest particle. Here, the total number of accumulated particles is 100%. The average particle size may be measured by methods known to one of ordinary skill in the art. For example, the average particle size may be measured with a particle size analyzer or measured by using a transmission electron microscope (TEM) or a scanning electron microscope (SEM) image. As an example of other measuring methods, the average particle size may be measured with a measurement device using dynamic light scattering. According to this method, the number of particles within predetermined size ranges may be counted, and an average particle diameter may be calculated therefrom.

The term "porosity" as used herein refers to a measure of the empty space (i.e., voids or pores) in a material, which is determined as a percentage of the volume of voids in a material based on the total volume of the material.

Figure 1C:
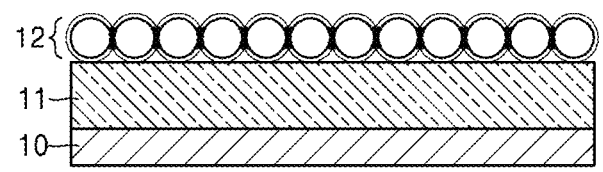
FIGS. 1C to 1E, 1O, 1P, and 1Q are schematic views illustrating various structures of an embodiment of a negative electrode for a lithium metal battery.
Figure 1D:
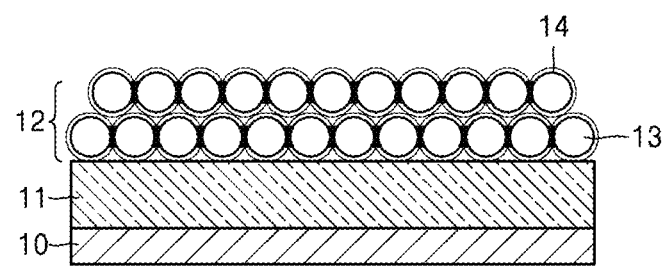
Figure 1E:
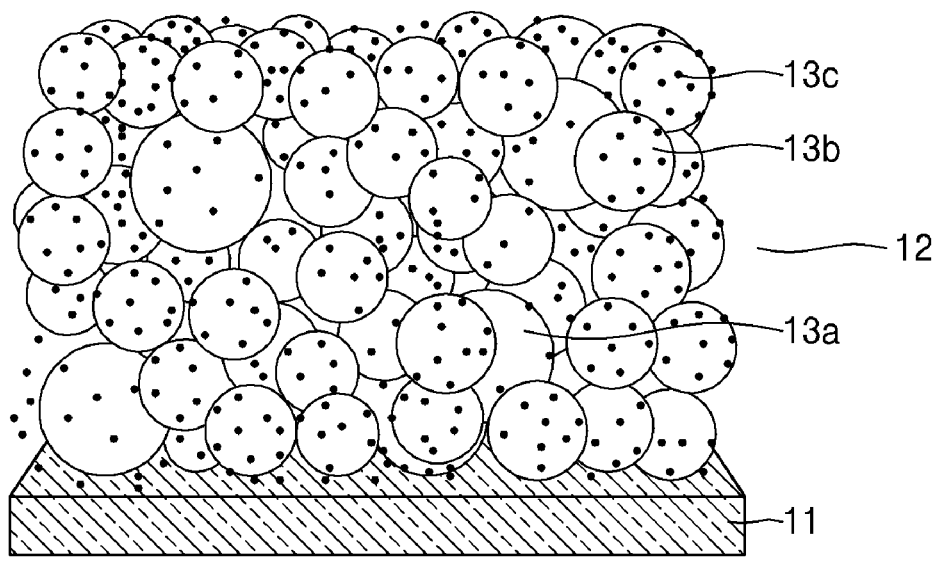
Figure 1F:
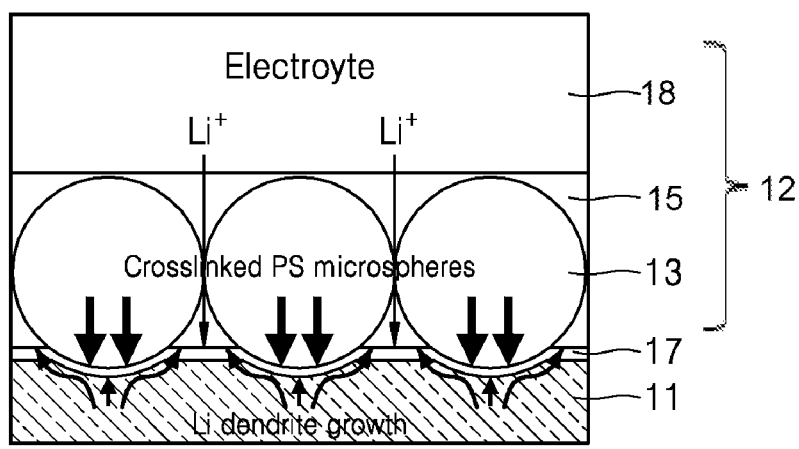
FIGS. 1F and 1G are schematic views illustrating the theoretical principle behind using a protective layer on a negative electrode for suppressing and guiding dendritic growth in a lithium metal battery, according to an embodiment.
Figure 1G:
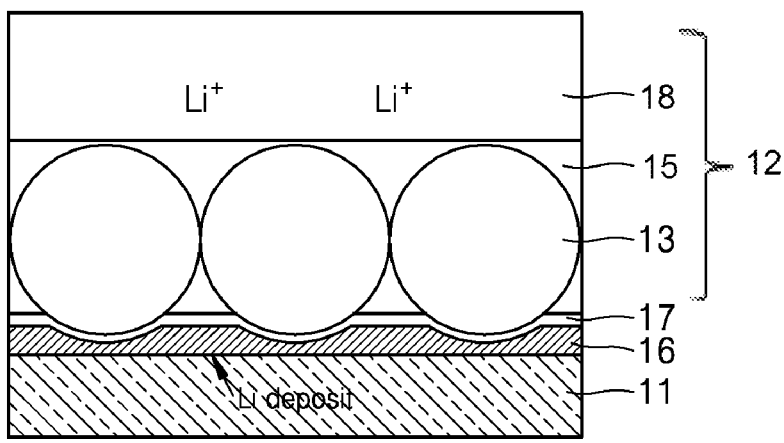
Figure 1H:
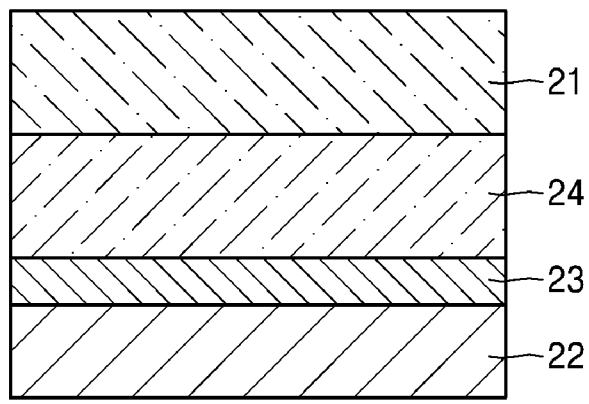
FIGS. 1H to 1L are schematic views illustrating structures of an embodiment of a lithium metal battery.
Figure 1I:
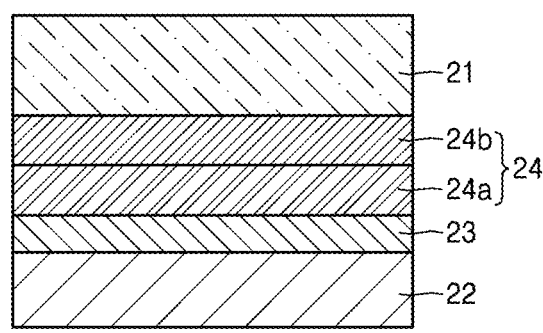
Figure 1J:
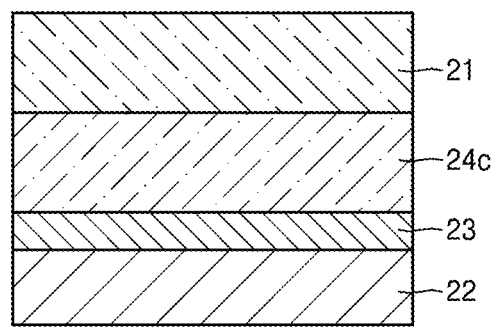
Figure 1K:
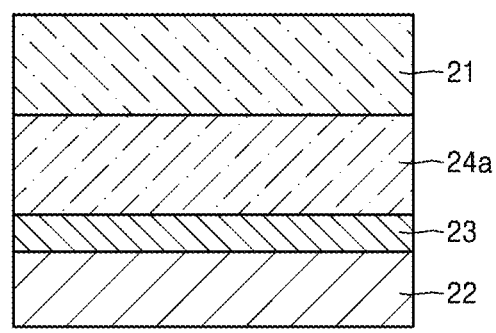
Figure 1L:
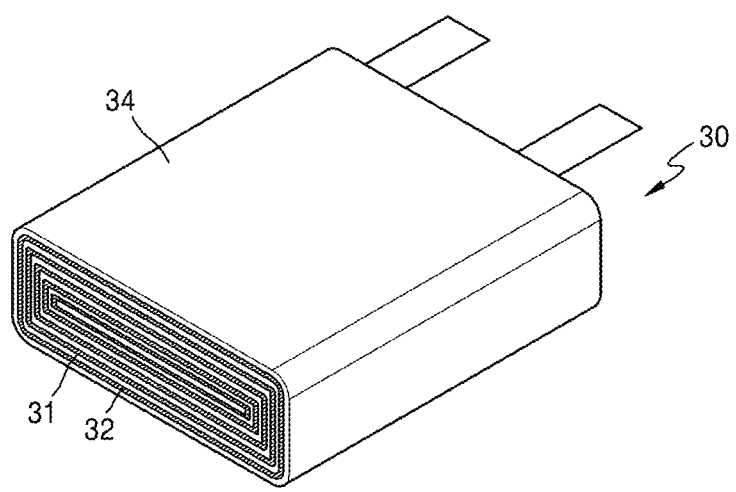
Figure 1M:
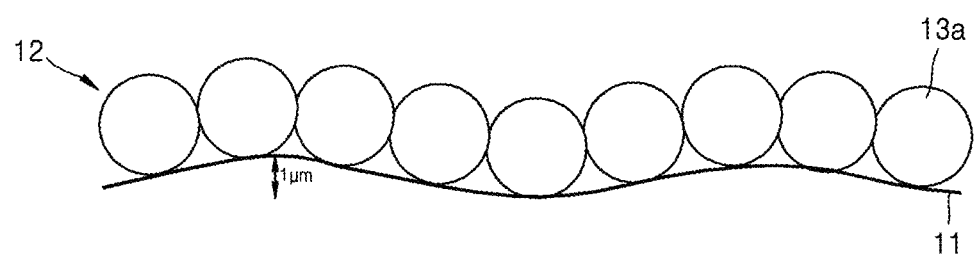
FIG. 1M is a schematic view illustrating an embodiment of a protective function of a protective layer for a lithium metal layer in a negative electrode for a lithium metal battery according to an embodiment, when microspheres in the protective layer have an average particle diameter of greater than about 1 micrometer (μm) to about 100 μm or less.
Figure 1N:
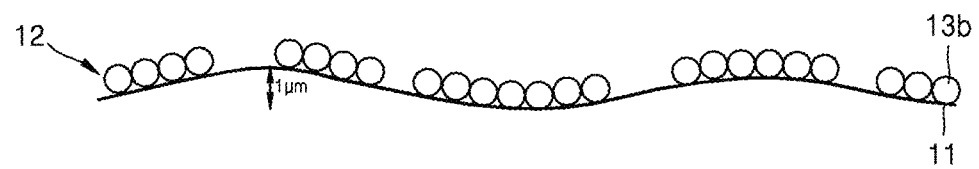
FIG. 1N is a schematic view illustrating an embodiment of a protective function of a protective layer for a lithium metal layer in a negative electrode for a lithium metal battery, when microspheres in the protective layer have an average particle diameter of about 1 μm or less.

FIG. 1M is a schematic view of an embodiment of a negative electrode for a lithium metal battery, which illustrates a protective function of a protective layer for a lithium metal layer in the negative electrode, when microspheres in the protective layer have a particle diameter greater than about 1 µm and about 100 µm or less. FIG. 1N is a schematic view of an embodiment of a negative electrode for a lithium metal battery, which illustrates a protective function of a protective layer for a lithium metal layer in the negative electrode, when microspheres in the protective layer have an average particle diameter of about 1 µm or less.

Referring to FIG. 1M, the protective layer 12 including microspheres 13a may be stacked on the lithium metal layer 11. A surface coating fraction of the microspheres 13a in the protective layer 12 of the lithium metal layer 11 and the gap between the microspheres 13a are factors which directly impact the protective function of the protective layer 12 of the lithium metal layer 11. The term "surface coating fraction" as used herein refers to the portion of the surface of the lithium metal layer which includes the protective layer relative to the total surface area of the lithium metal layer. The surface coating fraction may be about 80%, about 85%, about 90%, about 95%, or about 100% of the total surface area of the lithium metal layer.

The lithium metal layer 11 may be, for example, a lithium metal. As shown in FIG. 1M, the lithium metal layer 11 may be sufficiently thin to have soft characteristics. The lithium metal layer 11 may have a thickness of, for example, about 5 µm to about 50 µm, about 10 µm to about 30 µm, or about 15 µm to about 25 µm. The lithium metal layer 11 may have a surface step difference of about ±1 µm. To protect the lithium metal layer 11 having such a surface step difference, it may be effective to use the microspheres 13a having an average particle diameter greater than about 1 µm and about 100 µm or less in the protective layer 12.

Meanwhile, as illustrated in FIG. 1N, when the protective layer 12 on the lithium metal layer 11 includes microspheres 13b having an average particle diameter of about 1 µm or less, for example, about 5 nm to about 300 nm, the aggregation and surface coating fraction of the microspheres 13b may be poor. As a result, the protective layer 12 may have an increased porosity, and a liquid electrolyte may be more likely to contact the lithium metal.

The particle in the protective layer 12 may include any suitable polymer that may be used to form the protective layers.

In some embodiments, the particle of the protective layer 12 may further include an ion conductive homopolymer, an ion conductive copolymer, an ion conductive crosslinked polymer having ionic conductivity, or a combination thereof. For example, the particle may further include polystyrene or a block copolymer including a styrene repeating unit.

In some embodiments, the particle in the protective layer 12 may include a polymer having low wettability against a liquid electrolyte.

The particle in the protective layer 12 may include polystyrene, a copolymer including a styrene repeating unit, a copolymer including a repeating unit having a crosslinkable functional group, or a combination thereof, and a crosslinked polymer. For example, the particle in the protective layer 12 may be a polymer, e.g., a homopolymer or a copolymer, including a styrene repeating unit. When the particle in the protective layer 12 is a polymer including a styrene repeating unit, which is hydrophobic and essentially not wettable to the electrolyte, the polymer does not adversely affect the lithium metal layer, and the reactivity of the lithium metal layer with the electrolyte may be suppressed.

For example, the particle may comprise a first polymer and a crosslinked polymer of the first polymer, wherein the first polymer may be polystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) acrylate-acrylonitrile-butadiene-styrene) copolymer, a poly((C1-C9 alkyl) methacrylate-butadiene-styrene) copolymer, a poly((C1-C9) alkyl acrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof.

Examples of the poly((C1-C9 alkyl) methacrylate-butadiene-styrene) copolymer include a poly(methyl methacrylate. or ethyl methacrylate, or butyl methacrylate, or hexyl methacrylate-butadiene-styrene) copolymer. Examples of the poly(styrene-(C1-C9 alkyl) acrylate) copolymer include a poly(styrene-methyl acrylate, or ethyl acrylate, or butyl acrylate, or hexyl acrylate) copolymer. Any of the foregoing copolymers may be in the form of a block copolymer as further described below.

The first polymer may have a crosslinkable group.

The poly(styrene-divinylbenzene) copolymer may be represented by Formula 1.

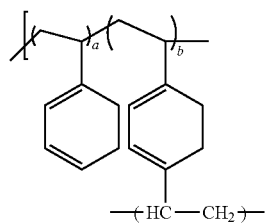

Formula 1

In Formula 1, a and b are mole fractions and may each independently be in a range of about 0.01 to about 0.99, wherein the sum of a and b may be equal to 1. In Formula 1, a may be from about 0.95 to about 0.99, about 0.96 to about 0.99, or for example, from about 0.98 to about 0.99; and b may be from about 0.01 to about 0.05, about 0.01 to about 0.04, or for example, about from 0.01 to about 0.02.

The poly(styrene-divinylbenzene) copolymer may be represented by Formula 1a.

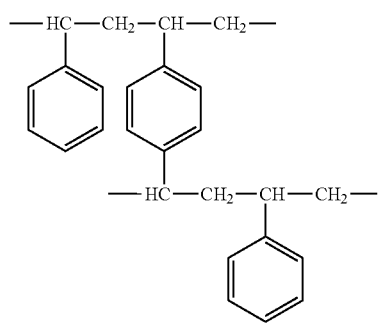

Formula 1a

The poly(styrene-divinylbenzene) copolymer may be represented by Formula 1b.

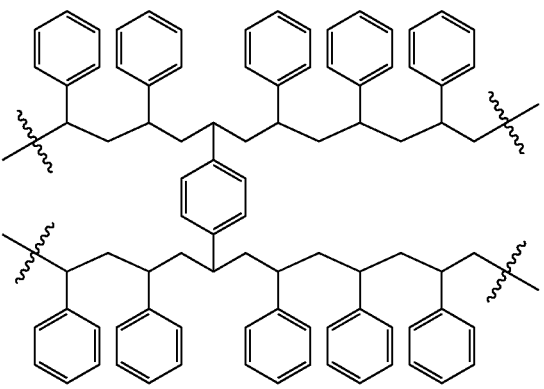

Formula 1b

The poly(acrylonitrile-butadiene-styrene) copolymer may be represented by Formula 2.

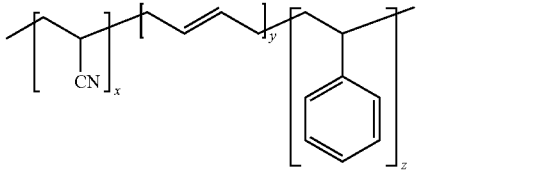

Formula 2

In Formula 2, x, y, and z are mole fractions and may each independently be in a range of about 0.01 to about 0.99, wherein the sum of x, y, and z may be equal to 1.

In Formula 2, x may be in a range of about 0.1 to about 0.35, y may be in a range of about 0.05 to about 0.55, and z may be in a range of about 0.2 to about 0.7. For example, x may be in a range of about 0.15 to about 0.35, y may be in a range of about 0.05 to about 0.3, and z may be in a range of about 0.4 to about 0.6.

The poly(styrene-divinylbenzene) copolymer represented by Formula 1 and the poly(acrylonitrile-butadiene-styrene) copolymer represented by Formula 2 may each independently have a degree of polymerization of about 2 to about 5,000, or for example, about 5 to about 1,000.

For example, the poly(styrene-divinylbenzene) copolymer represented by Formula 1 and the poly(acrylonitrile-butadiene-styrene) copolymer represented by Formula 2 may each be a block copolymer.

The term "crosslinked polymer" refers to a polymer having crosslinkable functional groups and having crosslink bonds formed between the crosslinkable functional groups. The crosslinked polymer may be a crosslinked material obtained from a copolymer containing a repeating unit having a crosslinkable functional group.

The crosslinked polymer may be a crosslinked material of a block copolymer having a polystyrene block and a polyethylene oxide block having an acrylate or methacrylate functional group; or a crosslinked material of a compound including at least one of a (C1-C9 alkyl) (meth)acrylate, (C2-C9 alkenyl) (meth)acrylate, a (C1-C12 glycol) di(meth)acrylate, preferably a diacrylate, a poly(C2-C6 alkylene glycol) di(meth)acrylate, preferably a diacrylate, or other polyol poly(meth)acrylate, preferably polyacrylate. The C1-C9 alkyl (meth)acrylate may be, for example, hexyl acrylate, or 2-ethylhexyl acrylate or the like. The (C2-C9 alkenyl) (meth)acrylate may be, for example, allyl methacrylate.

Examples of the glycol diacrylate include 1,4-butanediol diacrylate, 1,3-butylene glycol diacrylate, a 1,6-hexanediol diacrylate, an ethylene glycol diacrylate, and neopentyl glycol diacrylate. Examples of the polyalkylene glycol diacrylate include diethylene glycol diacrylate, triethylene glycol diacrylate, tetraethylene glycol diacrylate, tripropylene glycol diacrylate, polyethylene glycol diacrylate, and polypropylene glycol acrylate.

Examples of the polyol polyacrylate include trimethylol propane triacrylate, pentaerythritol tetraacrylate, and pentaerythritol triacrylate.

Examples of the crosslinked polymer include a poly(styrene-divinylbenzene) copolymer, a poly(methyl methacrylate-divinylbenzene), and a crosslinked material of the first polymer. Here, the first polymer may have crosslinkable functional groups, and the crosslinked material of the first polymer is formed by the crosslinking between the crosslinkable functional groups.

In a copolymer including a styrene repeating unit, the amount of the styrene repeating unit may be in a range of about 65 parts to about 99 parts by weight, for example, about 80 parts to about 99 parts by weight, for example, about 90 parts to about 99 parts by weight, or for example, about 96 parts to about 99 parts by weight, based on 100 parts by weight of the copolymer.

In a copolymer including a divinylbenzene as a repeating unit, the amount of divinylbenzene may be in a range of about 1 part to about 35 parts by weight, for example, about 1 part to about 20 parts by weight, for example, about 1 part to about 10 parts by weight, for example, about 1 part to about 4 parts by weight, for example, about 3 parts to about 7 parts by weight, or for example, about 5 parts by weight, based on 100 parts by weight of the copolymer.

In the above-listed poly(methyl methacrylate-divinylbenzene) copolymer, the poly(ethyl methacrylate-divinylbenzene) copolymer, the poly(pentyl methacrylate-divinylbenzene) copolymer, the poly(butyl methacrylate-divinylbenzene) copolymer, the poly(propyl methacrylate-divinylbenzene) copolymer, the amount of methyl methacrylate, ethyl methacrylate, pentyl methacrylate, butyl methacrylate, or propyl methacrylate, respectively, as a repeating unit, may be, e.g., in a range of about 65 parts to 99 parts by weight, about 80 parts to about 99 parts by weight, about 90 parts to about 99 parts by weight, or about 96 parts to about 99 parts by weight, based on 100 parts by weight of the copolymer.

In the aforementioned poly(styrene-ethylene-butylene-styrene) copolymer, the poly(styrene-methyl methacrylate) copolymer, the poly(styrene-acrylonitrile) copolymer, the poly(styrene-vinylpyridine) copolymer, the poly(acrylonitrile-butadiene-styrene) copolymer, the poly(acrylonitrile-ethylene-propylene-styrene) copolymer, the poly(methyl methacrylate-acrylonitrile-butadiene-styrene) copolymer, the poly(methyl acrylate-butadiene-styrene) copolymer, the poly(styrene-(C1-C9 alkyl) acrylate) copolymer, and the poly(acrylonitrile-styrene-(C1-C9 alkyl) acrylate) copolymer, the amount of the styrene repeating unit may be in a range of about 65 parts to about 99 parts by weight, for example, about 80 parts to about 99 parts by weight, for example, about 90 parts to about 99 parts by weight, or for example, about 96 parts to about 99 parts by weight, based on 100 parts by weight of the copolymer. When the aforementioned copolymers are each a ternary or quaternary copolymer, the non-styrene repeating units may be combined in any of a variety of ratios within balance except for the amount of the styrene repeating units. The aforementioned copolymers may include a block copolymer, a random copolymer, an alternating copolymer, and a graft copolymer. These copolymers may have a weight average molecular weight of about 10,000 Daltons to about 200,000 Daltons.

The terms "first repeating unit" and "second repeating unit" respectively refer to the first and second repeating units of the aforementioned copolymers that are different from each other. In the block copolymer, a block including the first repeating unit may have a weight average molecular weight of about 10,000 Daltons or greater, about 10,000 Daltons to about 500,000 Daltons, or in some embodiments, about 15,000 Daltons to about 400,000 Daltons. In some embodiments, in the block copolymer, a block including the first repeating unit may have a weight average molecular weight in a range of about 20,000 Daltons to about 200,000 Daltons. The amount of the block including the first repeating unit may be in a range of about 20 parts to about 50 parts by weight, for example, about 20 parts to about 40 parts by weight, or for example, about 22 parts to about 30 parts by weight, based on 100 parts by weight of the block copolymer. When the block including the first repeating unit is used, a protective layer may have suitable mechanical properties, e.g., improved strength.

In the block copolymer, a block including the second repeating unit may have a weight average molecular weight of about 10,000 Daltons or greater, about 10,000 Daltons to about 510,000 Daltons, or in some embodiments, about 15,000 Daltons to about 400,000 Daltons. In some embodiments, in the block copolymer, a block including the second repeating unit may have a weight average molecular weight in a range of about 20,000 Daltons to about 200,000 Daltons. When the block including the second repeating unit having a weight average molecular weight within any of these ranges is used, the protective layer may have improved ductility, elasticity, and strength characteristics.

In the present specification, the weight average molecular weight may be measured by methods that are widely known to those of skilled in the art. For example, the weight average molecular weight may be measured by gel-permeation chromatography (GPC), against, for example polystyrene standards.

The block copolymer may be a diblock copolymer (A-B), a triblock copolymer (A-B-A' or B-A-B'), or a combination thereof.

The particle in the protective layer may include polyvinyl pyridine, polyvinyl cyclohexane, polyglycidyl acrylate, poly(2,6-dimethyl-1,4-phenylene oxide), polyolefin, poly(tert-butyl vinyl ether), polycyclohexyl vinyl ether, polyvinyl fluoride, a poly(styrene-co-maletic anhydride) copolymer, polyglycidyl methacrylate, polyacrylonitrile, a polymeric ionic liquid, or a combination thereof.

The particle in the protective layer may be a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(methyl acrylate-divinylbenzene) copolymer, a poly(ethyl acrylate-divinylbenzene) copolymer, a poly(pentyl acrylate-divinylbenzene) copolymer, poly(butyl acrylate-divinylbenzene) copolymer, a poly(propyl acrylate-divinylbenzene) copolymer, a poly(acrylonitrile-butadiene-styrene) copolymer, or a combination thereof.

When the particle in the protective layer includes a crosslinked polymer as described above, individual particles may be connected to each other due to crosslinking between the particles, and as a result, the protective layer may have improved mechanical strength. The protective layer may have a degree of crosslinking in a range of about 10% to about 30%, for example, about 12% to about 28%, or for example, about 15% to about 25%.

The particle in the protective layer may have an interconnected structure. Also, the coating layer in the composite particles included in the protective layer may be present in an independent phase while maintaining a porous structure formed between the particles in the protective layer.

Structures of negative electrodes for lithium metal batteries, according to one or more embodiments, will be further described with reference to the attached drawings. In FIGS. 1A to 1D, as a non-limiting example, the particle 13 in the protective layer 12 may have a microspheric shape.

Referring to FIG. 1A, a negative electrode may include a lithium metal layer 11, wherein the lithium metal layer 11 may include lithium metal or a lithium metal alloy. The protective layer 12 may be on the lithium metal layer 11. The protective layer 12 may include the composite particle 20. The composite particle 20 may have gaps (i.e., space) between the particles 13, and ions may be transported through these gaps. Thus, when such a protective layer 12 is used, the negative electrode may have improved ion conductivity. Furthermore, the gaps, for example, the pore structure between the particles 13, may provide a space for lithium dendritic growth and act as a guide for growth of lithium dendrites.

The lithium metal alloy may include a lithium metal and a metal/metalloid alloyable with lithium metal or an oxide of the metal/metalloid. Examples of the metal/metalloid alloyable with lithium metal or an oxide of thereof include Si, Sn, Al, Ge, Pb, Bi, Sb, a Si—Y' alloy (wherein Y' is an alkaline metal, an alkaline earth metal, a Group 13 element, a Group 14 element, a transition metal, a rare earth element, or a combination thereof, except for Si), a Sn—Y' alloy (wherein Y' is an alkaline metal, an alkaline earth metal, a Group 13 to 16 element, a Group 16 element, a transition metal, a rare earth element, or a combination thereof, except for Sn), and MnOx (wherein $0<x\leq 2$).

Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. Examples of the oxide of a metal/metalloid alloyable with lithium metal include a lithium titanium oxide, a vanadium oxide, a lithium vanadium oxide, $SnO_2$, and $SiO_x$ (wherein $0<x<2$).

Figure 1O:
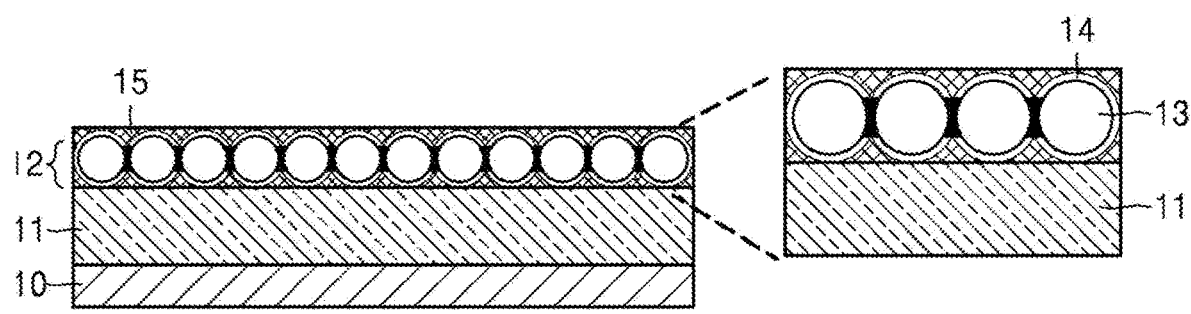
Figure 1P:
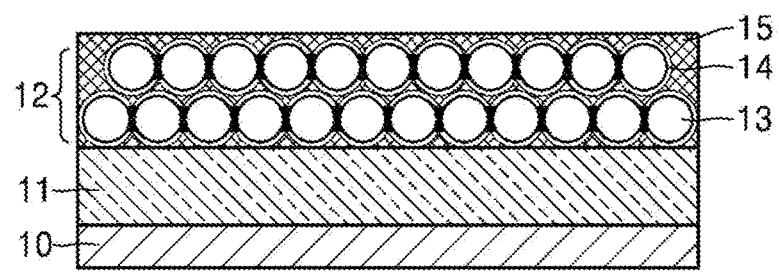
Figure 1Q:
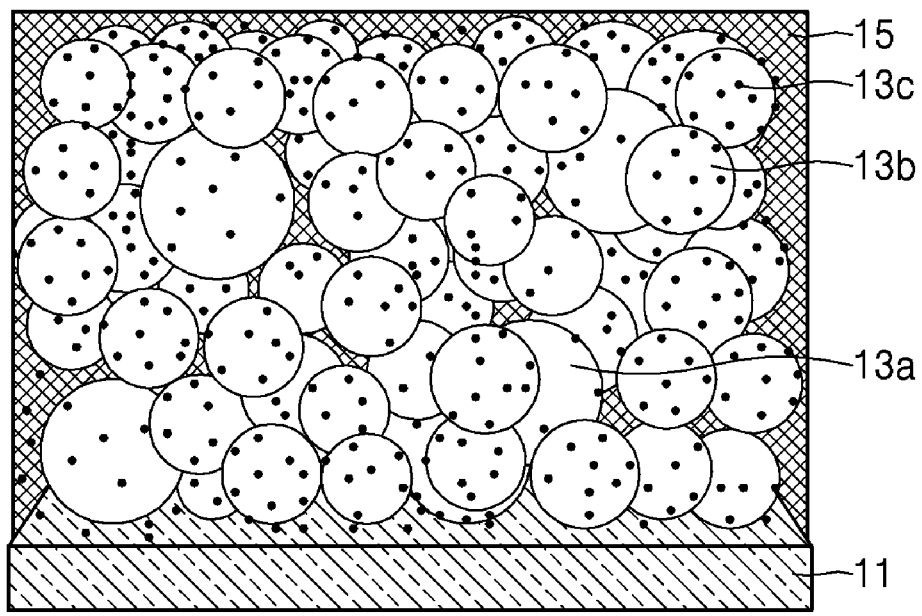
Figure 1R:
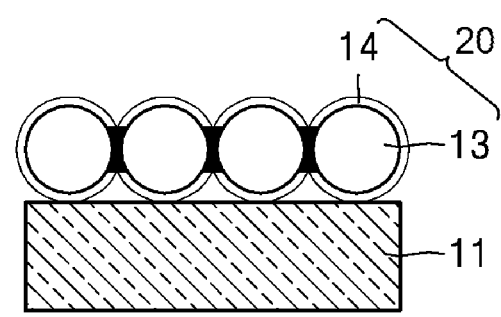
FIG. 1R is an enlarged view of the indicated portion of FIG. 1C.

As shown in FIG. 1C, and in FIG. 1R which is an enlarged view of the indicated portion of FIG. 1C, a negative electrode may include a lithium metal layer 11 on a current collector 10, wherein the lithium metal layer 11 may include lithium metal or a lithium metal alloy. The protective layer 12 may include the composite particle (20), and the composite particle (20) may include the particle 13 and the coating layer 14 containing an ion conductive material on a surface of the particle 13. A lithium salt or a liquid electrolyte may be present between the particles 13, although not shown in the drawings. A liquid electrolyte may include a lithium salt and an organic solvent.

The coating layer 14 containing an ion conductive material is included in the protective layer 12, which may improve the strength of the protective layer 12 and serve as a binder. In some embodiments, as shown in FIGS. 1O and 1P, a crosslinked material of a polymerizable oligomer 15 may be present between the particles 13 included in the protective layer 12. Since the crosslinked material of a polymerizable oligomer 15 is present in the empty space between the particles 13, the protective layer 12 may be formed as one body, thereby having improved mechanical properties. Therefore, when such a protective layer 12 is used, it may be highly effective to suppress lithium dendritic growth, the lithium metal battery may have improved lithium deposition density upon charging and discharging and improved conductivity.

In an embodiment in which the crosslinked material of a polymerizable oligomer 15 is ion conductive, ions may be transferred through the crosslinked material of a polymerizable oligomer 15. Thus, when such a protective layer 12 is used, the negative electrode may have improved ion conductivity.

The polymerizable oligomer may be diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, 1,6-hexanediol diacrylate, ethoxylated neopentyl glycol diacrylate (NPEOGDA), propoxylated neopentyl glycol diacrylate (NPPOGDA), allyl methacrylate (ALMA), trimethylol propane triacrylate (TMPTA), trimethylol propane trimethacrylate (TMPTMA), pentaerythritol triacrylate (PETA), ethoxylated/propoxylated trimethylolpropane triacrylate (TMPEOTA)/(TMPPOTA), propoxylated glyceryl triacrylate (GPTA)/(GP POTA), tris(2-hydroxyethyl) isocyanurate triacrylate (THEICTA), pentaerythritol tetraacrylate (PETTA), dipentaerythritol pentaacrylate (DPEPA), or a combination thereof, wherein an amount of the crosslinked material of a polymerizable oligomer 15 may be in a range of about 10 parts to about 50 parts by weight, based on 100 parts by weight of the particle. As used herein, "oligomer" refers to a material with at least two polymerizable functionalities. Also, the term "polymerizable oligomer" is understood herein as including polymerizable monomers. The weight average molecular weight of the polymerizable oligomer is, for example, 2,000 or less.

In some embodiments, as shown in FIG. 1C, in the protective layer 12, the particles 13 may form a single layered structure.

In some embodiments, as shown in FIG. 1D, in the protective layer 12, the particles 13 may form a double layered structure in which the particles 13 are stacked on the lithium metal layer 11 in two layers. In FIG. 1D, the coating layer 14 containing an ion conductive material may be present on a surface of the particle 13, just as in FIG. 1C.

In some embodiments, as shown in FIGS. 1E and 1Q, the protective layer 12 may have a multi-layered structure in which particles 13a, 13b, and 13c, each having a different size, are mixed together. As such, in the case that the protective layer 12 has a multi-layered structure in which the particles 13a, 13b, and 13c, each having a different size, are mixed together, the space for dendritic growth may be suppressed by lowering the porosity or improving the packing density of the protective layer 12, and thereby reducing contact between the electrolyte and the lithium metal. The dendritic growth may also be suppressed by increasing the thickness of the protective layer 12.

FIGS. 1F and 1G are schematic views explaining the effects of a lithium negative electrode according to an embodiment.

As shown in FIG. 1F, a lithium negative electrode according to an embodiment may have a structure including the protective layer 12 on the lithium metal layer 11 that has a solid-electrolyte interphase (SEI) 17 thereon, the protective layer 12 including the particles 13. The lithium metal layer 11 and the SEI 17 may have soft characteristics due to, for example, a small thickness thereof, and thus may be pressed down by the particles 13, resulting in the formation of grooves in the lithium metal layer 11 and the SEI 17. As a result, grooves may be formed on the lithium metal layer 11 and the SEI 17.

The step difference of the groove may be, for example, about ±1 um or less. The crosslinked material of a polymerizable oligomer 15 may be disposed between the particles 13. The crosslinked material of a polymerizable oligomer 15 may further enhance the mechanical strength of the protective layer 12.

In FIGS. 1F and 1G, the particles 13 may include, for example, cross-linked polystyrene microspheres. It is believed that the pressing force exerted by the particles 13 on the lithium metal layer 11 and the SEI 17, may suppress lithium dendritic growth and guide growth of lithium dendrites into the gaps (spaces) between the particles 13. When a negative electrode including such a protective layer is charged, lithium deposition may occur to form a lithium deposition layer 16 on the lithium metal layer 11, as illustrated in FIGS. 1F and 1G, with the SEI 17 and the protective layer 12 including the particles 13 and the crosslinked material of a polymerizable oligomer 15 being stacked in this stated order on the lithium deposition layer 16.

When the protective layer 12 described above is used in a negative electrode, the lithium deposition density of the negative electrode may be remarkably improved. In addition, the network and pore structures of the protective layer 12 may serve as spaces for dendritic growth and at the same time control the amount of dendritic growth, and finally may adsorb byproducts from a positive electrode. Thus, a lithium metal battery including such a lithium negative electrode may have improved lifespan and stability even at a high temperature.

The particles 13 in the protective layer 12 may include, for example, a poly(styrene-divinylbenzene) copolymer.

When the particles 13 in the protective layer 12 are formed of a crosslinked polymer as described above, the particles 13 may be chemically linked to one another, and thus form a high-intensity microsphere network structure.

The protective layer 12 may have a porosity in a range of about 25% to about 50%, for example, about 28% to about 48%, or about 30% to about 45%. A pore size and porosity of the protective layer 12 may be determined depending on the size of the particles 13.

In the protective layer 12 according to any of the above-described embodiments, substantially no agglomeration of the particles 13 may occur, so that the protective layer 12 may have a uniform thickness. The thickness of the protective layer 12 may be in a range of about 1 μm to about 10 μm, for example, about 2 μm to about 9 μm, or for example, about 3 μm to about 8 μm. The thickness deviation of the protective layer 12 may be in a range of about 0.1 μm to about 4 μm, for example, about 0.1 μm to about 3 μm, or for example, about 0.1 μm to about 2 μm.

The lithium salt in the protective layer 12 may be, for example, LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, $LiB(C_2O_4)_2$, or a combination thereof.

The amount of the lithium salt may be in a range of about 10 parts to about 70 parts by weight, for example, about 15 parts to about 60 parts by weight, or for example, about 20 parts to about 50 parts by weight, based on 100 parts by weight of the particle. When the amount of the lithium salt is within any of these ranges, the protective layer 12 may have improved ion conductivity.

The organic solvent of the liquid electrolyte 18 in the protective layer 12 may be a carbonate compound, a glyme compound, and a dioxolane compound. Examples of the carbonate compound include ethylene carbonate, propylene carbonate, dimethyl carbonate, fluoroethylene carbonate, diethyl carbonate, and ethyl methyl carbonate.

The glyme compound may be, for example, poly(ethylene glycol)dimethyl ether (PEGDME; polyglyme), tetra(ethylene glycol)dimethyl ether (TEGDME; tetraglyme), tri(ethylene glycol)dimethyl ether (triglyme), poly(ethylene glycol)dilaurate (PEGDL), poly(ethylene glycol)monoacrylate (PEGMA), poly(ethylene glycol)diacrylate (PEGDA), or a combination thereof.

The dioxolane compound may be, for example, 1,3-dioxolane, 4,5-diethyl-1,3-dioxolane, 4,5-dimethyl-1,3-dioxolane, 4-methyl-1,3-dioxolane, and 4-ethyl-1,3-dioxolane. Examples of the organic solvent include 2,2-dimethoxy-2-phenyl acetophenone, dimethyl ether (DME), 1,2-dimethoxyethane, 1,2-diethoxyethane, tetrahydrofuran, gamma-butyrolactone, 1,1,2,2-tetrafluoroethyl 2,2,3,3-tetrafluoropropyl ether, or a combination thereof.

The organic solvent may be, for example, ethylene carbonate, propylene carbonate, dimethyl carbonate, diethyl carbonate, ethyl methyl carbonate, fluoroethylene carbonate, gamma-butyrolactone, 1,2-dimethoxyethane, 1,2-diethoxyethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, or a combination thereof.

When a lithium metal battery including a negative electrode for a lithium metal battery according to an embodiment is charged, the thickness of a lithium deposition layer, deposited on a lithium electrode surface, may be about 40 μm or less, the lithium deposition layer may be on the negative electrode, and a lithium deposition density of the lithium deposition layer may be in a range of about 0.2 grams per cubic centimeter ($g/cm^3$) to about 0.5 $g/cm^3$, or for example, about 0.33 $g/cm^3$ to about 0.48 $g/cm^3$ (g/cc).

In some embodiments, a lithium deposition density of a lithium metal battery including a lithium negative electrode according to any of the above-described embodiments may be greater than a lithium deposition density of a lithium metal battery not including the protective layer 12 and using bare lithium metal as a negative electrode, at about 50% or greater, for example, about 50% to about 90%. As such, the deposition density of the negative electrode according to an embodiment is highly excellent. The deposition density may be improved because the lithium negative electrode includes a high strength protective layer. The protective layer 12 may have a Young's modulus of about $10^6$ Pa or greater, for example, in a range of about 3 gigapascals (GPa) to about 6 GPa, at a temperature of about 25° C.

When the protective layer 12 has a Young's modulus within any of these ranges, the protective layer 12 may effectively suppress volume change in the negative electrode, and the negative electrode may less likely to be partially broken by the formation of lithium dendrites on the surface of the lithium metal layer and cause a short.

In some embodiments, the protective layer 12 may have a tensile strength of about 2.0 megapascals (MPa) or greater at a temperature of about 25° C. An interfacial resistance between the lithium metal layer and the protective layer 12, which may be obtained through an impedance measurement and using a Nyquist plot, may be decreased by at least about 10%, at a temperature of about 25° C., as compared with bare lithium metal. The negative electrode according to any of the above-described embodiments including the protective layer 12 for the lithium metal layer may have a lower interfacial resistance and thus have better interfacial characteristics, as compared with a bare lithium metal layer. For example, the negative electrode may have an oxidation current or reduction current of about 0.05 milliampere per square centimeter ($mA/cm^2$) or less in a voltage range of about 0.0 volts (V) to about 6.0 V vs. lithium metal.

When a protective layer according to any of the above-described embodiments is used, a lithium metal battery may be substantially free of battery swelling issues after repeated cycles of charging and discharging.

In some embodiments, the direct contact region between the liquid electrolyte in the protective layer and the lithium metal layer may be in a range of about 30 vol % to about 80 vol % based on a total volume of the direct contact region between the protective layer and the lithium metal layer.

Figure 9A:
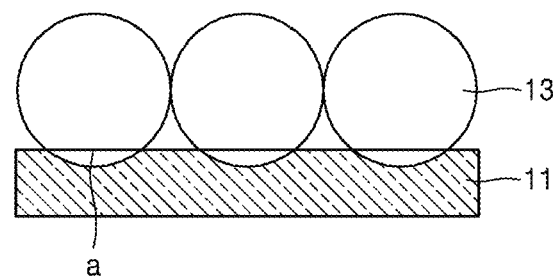
FIGS. 9A to 9C are schematic views of embodiments of negative electrodes illustrating the arrangement of particles of a protective layer on a surface of a lithium metal layer, according to various embodiments.
Figure 9B:
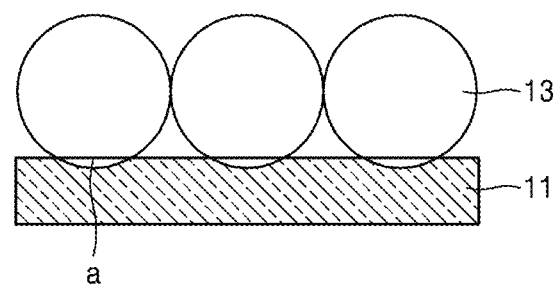
Figure 9C:
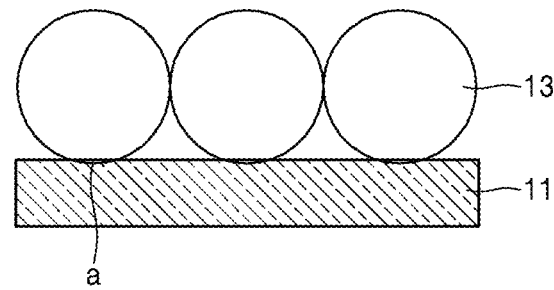
Figure 10:
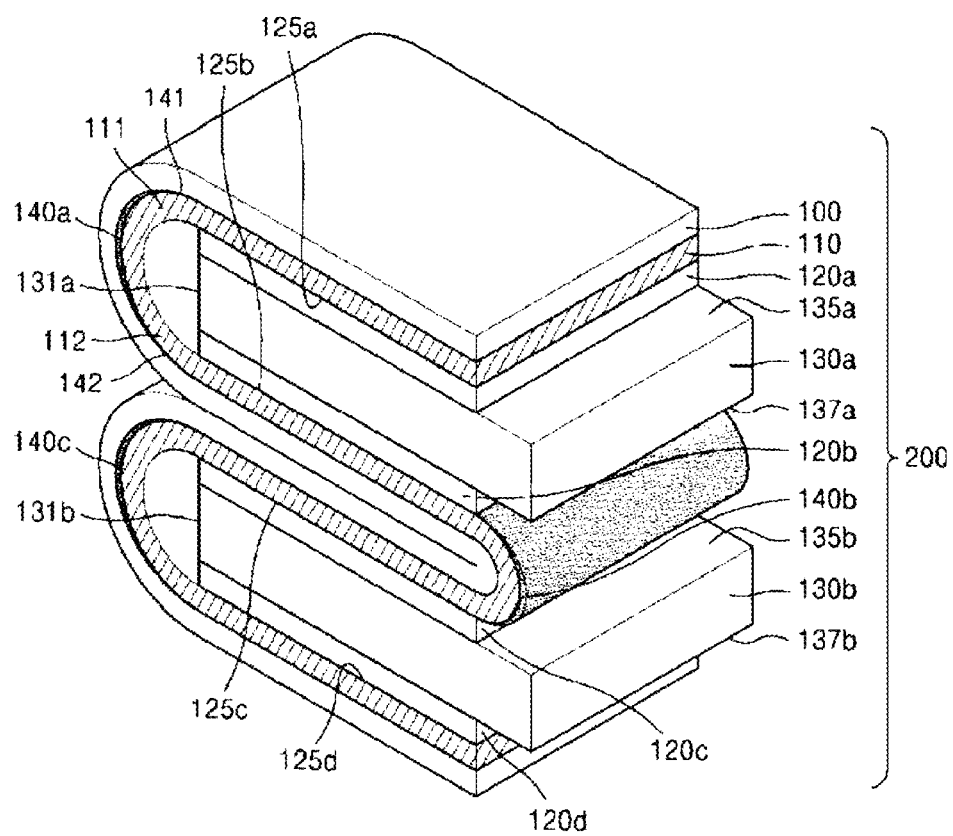
FIG. 10 is a schematic view of a structure of an embodiment of a lithium metal battery.

FIGS. 9A to 9C are schematic views of embodiments of negative electrodes for a lithium metal battery, illustrating the arrangement of microspheres 13 on a surface of a lithium metal layer 11.

Referring to FIGS. 9A, 9B, and 9C, the microspheres 13 having a diameter of about 3 μm may be disposed on the surface of the lithium metal electrode 11. In FIGS. 9A, 9B, and 9C, the microspheres 13 may be on an upper surface of the lithium metal electrode 11.

In FIGS. 9A, 9B, and 9C, the length of the lithium metal layer 11 may be about 5.4 μm. In addition, in FIGS. 9A, 9B, and 9C, a, which indicates a buried depth of the microspheres 13, may be, for example, about 1.2 μm, 0.9 μm, and 0.5 μm, respectively. The direct contact region between liquid electrolyte in the protective layer and the lithium metal electrode may be about 33.3 vol %, about 50 vol % and about 72.2 vol %, based on a total volume of the direct contact region between the protective layer and the lithium metal layer in the embodiments of FIGS. 9A, 9B, and 9C, respectively.

A method of manufacturing a negative electrode for a lithium metal battery, according to an embodiment, may be as follows.

First, composite particles according to an embodiment are mixed with a solvent to prepare a protective layer-forming composition.

The protective layer-forming composition may be coated on a lithium metal layer and dried to form a protective layer, thereby completing the manufacture of a negative electrode for a lithium metal battery.

The solvent may be, for example, tetrahydrofuran, N-methylpyrrolidone, or the like. The amount of the solvent may be in a range of about 100 parts to 5,000 parts by weight based on 100 parts by weight of the particles.

An ion conductive polymer may be further added to the protective layer-forming composition.

An ionic liquid, a polymeric ionic liquid, a lithium salt, or a combination thereof may be further added to the protective layer-forming composition.

The coating may be performed using any method suitable for forming a protective layer. For example, the coating may be performed using spin coating, roll coating, curtain coating, extruding, casting, screen printing, inkjet printing, doctor blade, or the like.

The drying may be performed at a temperature of about 20° C. to about 25° C. When the drying is performed at a low temperature within this temperature range, deformation of the lithium metal layer may not occur. A protective layer having a monodisperse single layer structure may be formed through direct coating of the protective layer-forming composition on the lithium metal layer, thereby improving efficiency in protective layer formation process. The resulting protective layer may also have excellent mechanical strength and improved ion conductivity.

The drying may be followed by roll-pressing. This roll-pressing may be performed under the suitable roll-pressing conditions for manufacturing batteries in the art. The roll-pressing may be performed, for example, at a pressure of about 1 kilogram force per centimeter (kgf/cm) to about 1.5 kgf/cm.

The method may further include coating a polymerizable oligomer composition obtained by mixing a polymerizable oligomer with a solvent on the coated and dried product; and performing a crosslinking reaction, after the coating and drying of the protective layer-forming composition on the lithium metal layer to form a protective layer.

After performing these processes, a crosslinked material of a polymerizable oligomer may be contained between the composite particle.

The composite particle used in preparing the protective layer-forming composition may include a particle; and a coating layer disposed on at least one portion of the particle and including an ion conductive oligomer including an ion conductive unit, an ion conductive polymer comprising an ion conductive unit, or a combination thereof, wherein the particle may include an organic particle, an inorganic particle, an organic-inorganic particle, or a combination thereof, optionally each having a particle size of greater than about 1 μm and about 100 μm or less.

The composite particle may be prepared as follows.

First, an ion conductive material, a particle, and a solvent may be mixed together to obtain a composite particle composition. The solvent may be removed from the composite particle composition to form a composite particle having a coating layer containing the ion conductive material formed on the particle.

The particle may be a microsphere having substantially the same size.

The protective layer may have an oxidation current or reduction current of about 0.05 $mA/cm^2$ or less in a voltage range of about 0.0 V to about 6.0 V vs. lithium metal. The protective layer may be electrochemically stable in a voltage range of about 0 V to 6.0 V, in some embodiments, about 0 V to 5.0 V, or in some other embodiments, about 0 V to 4.0 V, vs. lithium. In some embodiments, the protective layer may have an electrochemically stable wide voltage window, and thus may be applicable to an electrochemical device operating at a high voltage.

The particle in the protective layer may be an organic particle. The organic particle may include, for example, polystyrene or a poly(styrene-divinylbenzene) copolymer.

The particle in the protective layer may be an inorganic particle. Examples of the inorganic particle include $SiO_2$, $TiO_2$, ZnO, $Al_2O_3$, and $BaTiO_3$.

The particle in the protective layer may be an organic-inorganic particle. The organic-inorganic particle may include, for example, a cage-structured silsesquioxane, a metal-organic framework (MOF), or a combination thereof.

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 3.

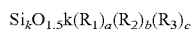  Formula 3

In Formula 3, $R_1$, $R_2$, and $R_3$ may each independently be hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 3, 0<a<20, 0<b<20, 0<c<20, and k=a+b+c, provided that a, b, and c may be selected in such a way that 6≤k≤20.

The cage-structured silsesquioxane may be a compound represented by Formula 4 or a compound represented by Formula 5.

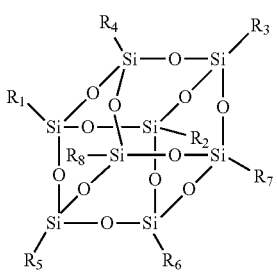

Formula 4

In Formula 4, $R_1$ to $R_8$ may each independently be hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

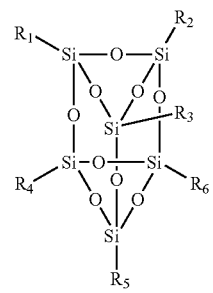

Formula 5

In Formula 5, $R_1$ to $R_6$ may each independently be hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, $R_1$ to $R_8$ in Formula 4 and $R_1$ to $R_6$ in Formula 5 may each be an isobutyl group. For example, the cage-structured silsesquioxane may be octaisobutyl-t8-silsesquioxane.

The MOF may be a porous crystalline compound in which a Group 2 to Group 15 metal ion or a Group 2 to Group 15 element ionic cluster is chemically bonded with an organic ligand.

The organic ligand refers to an organic group that may form an organic bond such as a coordinate bond, ionic bond, or covalent bond. For example, an organic group having at least two binding sites for such metal ions as described above may form a stable structure through binding with the metal ions.

The Group 2 to Group 15 element ion may be cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, or a compound having at least one functional group that is an amino group, an imino group, an amide group, a dithio carboxylic acid group (—$CS_2H$), a dithio carboxylate group (—$CS_2$—), a pyridine group, a pyrazine group, or a combination thereof. A combination comprising at least one of the foregoing may be used.

Examples of the aromatic dicarboxylic acid and aromatic tricarboxylic acid include a benzene dicarboxylic acid, a benzene tricarboxylic acid, a biphenyl dicarboxylic acid, and a terphenyl-dicarboxylic acid.

For example, the organic ligand may be a group derived from compounds represented by Formula 6.

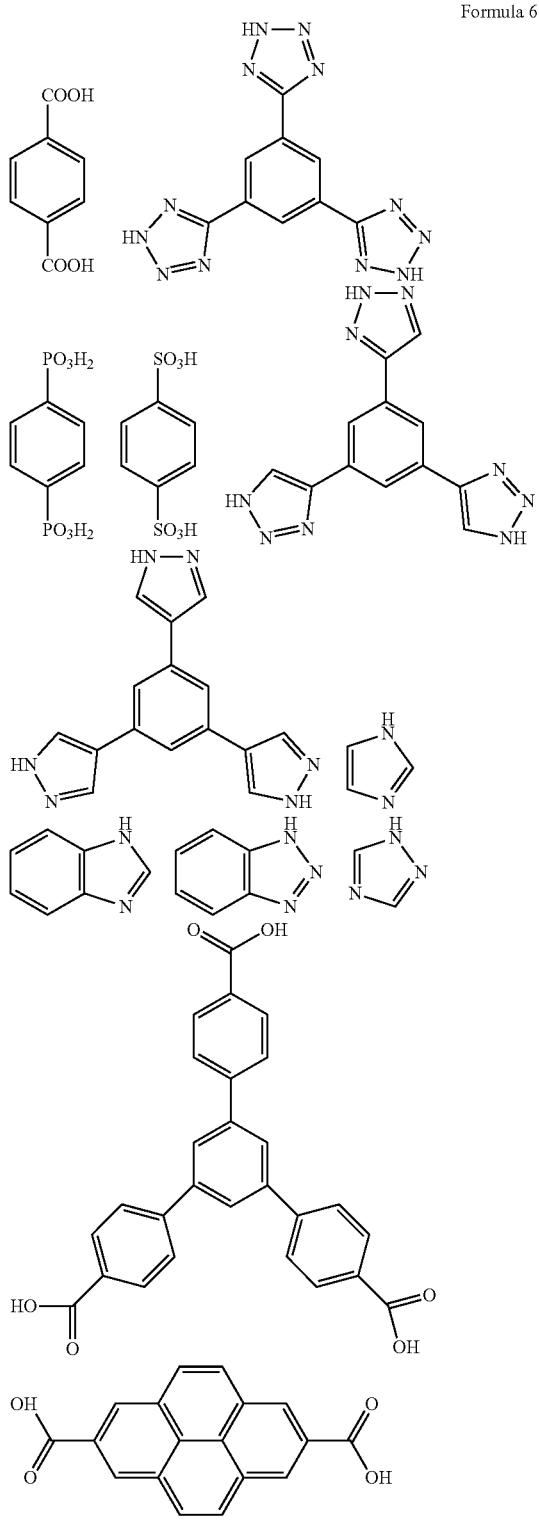

Formula 6

Examples of the MOF include $Ti_8O_8(OH)_4[O_2C-C_6H_4-CO_2]_6$, $Cu\ (bpy)(H_2O)_2(BF_4)_2(bpy)\{bpy=4, 4'\text{-bi-pyridine}\}$, $Zn_4O(O_2C-C_6H_4-CO_2)_3$ (Zn-terephthalic acid-MOF, Zn-MOF), and $Al(OH)\{O_2C-C_6H_4-CO_2\}$.

The protective layer may include at least one first particle; or a crosslinked material of the first particle, wherein the first particle may be a cage-structured silsesquioxane, an MOF, $Li_{1+x+y}Al_xTi_{2-x}Si_yP_{3-y}O_{12}$, wherein $0<x<2$ and $0\le y<3$, $BaTiO_3$, $Pb(Zr_pTi_{1-p})O_3$ (PZT), wherein $0\le p\le 1$, $Pb_{1-x}La_xZr_{1-y}Ti_yO_3$ (PLZT), wherein $0\le x<1$ and $0\le y<1$, $Pb(Mg_{1/3}Nb2/3)O_3-PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, $Li_3PO_4$, $Li_xTi_y(PO_4)_3$, wherein $0<x<2$ and $0<y<3$, $Li_xAl_yTi_z(PO_4)_3$, wherein $0<x<2$, $0<y<1$, and $0<z<3$, $Li_{1+x+y}(Al_pGa_{1-p})_x(Ti_qGe_{1-q})_{2-x}Si_yP_{3-y}O_{12}$, wherein $0\le x\le 1$ and $0\le y\le 1$, $0\le o\le 1$, $0\le q\le 1$, $Li_xLa_yTiO_3$, wherein $0<x<2$ and $0<y<3$, $Li_xGe_yP_zS_w$, wherein $0<x<4$, $0<y<1$, $0<z<1$, and $0<w<5$, $Li_xN_y$, wherein $0<x<4$ and $0<y<2$, $Li_xSi_yS_z$, wherein $0<x<3$, $0<y<2$, and $0<z<4$, $Li_xP_yS_z$, wherein $0\le x<3$, $0<y<3$, and $0<z<7$, $Li_2O$, $LiF$, $LiOH$, $Li_2CO_3$, $LiAlO_2$, $Li_2O-Al_2O_3-SiO_2-P_2O_5-TiO_2-GeO_2$, $Li_{3+x}La_3M_2O_{12}$, wherein $0\le x\le 5$, and M may be Te, Nb, and Zr, or a combination thereof. The crosslinked material of the first particle may have a functional group, which may be crosslinkable with the first particle, by which a crosslinked structure may be formed.

The crosslinkable functional group may be any suitable crosslinkable functional group. Examples thereof include an acrylate group, a methacrylate group, a vinyl group, an allyl group, and an epoxy group.

When the particles in the protective layer have a crosslinkable functional group on a surface thereof, the particles may be covalently bound so that the protective layer may have improved mechanical strength.

The term "ionic liquid" refers to a salt in a liquid state at room temperature or a fused salt at room temperature that consists of ions having a melting point equal to or below room temperature. The ionic liquid may comprise a cation such as an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and an anion such as $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^{2-}$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$, or a combination thereof.

In some embodiments, the ionic liquid may be N-methyl-N-propyl-pyrrolidinium bis(trifluoromethylsulfonyl)imide, N-butyl-N-methyl-pyrrolidinium bis(fluoromethylsulfonyl)imide, 1-butyl-3-methyl-imidazolium bis(trifluoromethylsulfonyl)imide, 1-ethyl-3-methyl-imidazolium bis(trifluoromethylsulfonyl)imide, or a combination thereof.

The amount of the ionic liquid may be in a range of about 5 parts to about 40 parts by weight, for example, about 7.5 parts to about 30 parts by weight, or for example, about 10 parts to about 20 parts by weight, based on 100 parts by weight of the protective layer. When the amount of the ionic liquid is within any of these ranges, the protective layer may have improved ion conductivity and improved mechanical properties.

When the protective layer includes an ionic liquid (IL) and a lithium salt, the mole ratio (IL/Li) of the ionic liquid to lithium ions may be in a range of about 0.1 to about 2.0, in some embodiments, about 0.2 to about 1.8, or in some other embodiments, about 0.4 to about 1.5. When the mole ratio of the ionic liquid to lithium ions is within any of these ranges, the protective layer may have high lithium ion mobility, high ion conductivity, and improved mechanical properties to effectively suppress growth of lithium dendrite on a surface of the negative electrode.

The polymeric ionic liquid which may be added to the protective layer-forming composition may be, for example, a polymerization product of ionic liquid monomers, or a polymeric compound. The polymeric ionic liquid is highly dissoluble in an organic solvent, and thus may further improve the ion conductivity of a protective layer when added to the protective layer-forming composition.

When the polymeric ionic liquid is prepared by polymerization of ionic liquid monomers as described above, a resulting product from the polymerization reaction may be washed and dried, followed by an anionic substitution reaction to have appropriate anions that may improve solubility in an organic solvent.

In some embodiments, the polymeric ionic liquid may include a repeating unit that includes: a cation such as an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and at least one anion such as $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

In some embodiments, the polymeric ionic liquid may be prepared by polymerization of ionic liquid monomers. For example, the ionic liquid monomers may have a polymerizable functional group such as a vinyl group, an allyl group, an acrylate group, or a methacrylate group, and may include at least one cation such as an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, or a combination thereof, and at least one of the above-listed anions.

Examples of the ionic liquid monomers include 1-vinyl-3-ethylimidazolium bromide, a compound represented by Formula 7, and a compound represented by Formula 8.

Formula 7

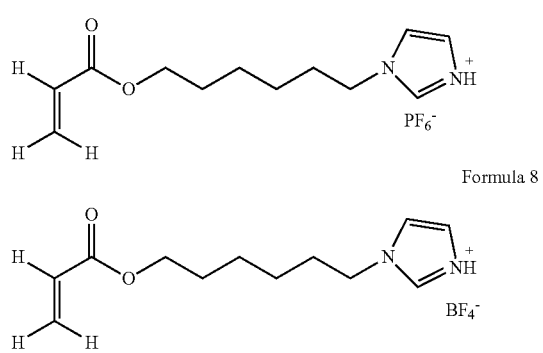

Formula 8

For example, the polymeric ionic liquid may be a compound represented by Formula 9 or a compound represented by Formula 10.

Formula 9

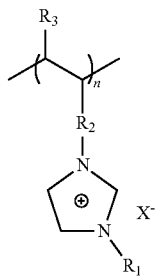

In Formula 9, $R_1$ and $R_3$ may each independently be hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group, R2 may be a chemical bond, a C1-C3 alkylene group, a C6-C30 arylene group, a C2-C30 heteroarylene group, or a C4-C30 divalent carbocyclic group, $X^-$ indicates an anion of the ionic liquid, and n may be in a range of about 500 to 2,800.

Formula 10

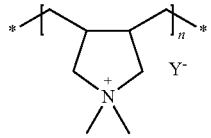

In Formula 10, $Y'''^-$ indicates an anion of the ionic liquid, and n may be in a range of about 500 to 2,800. In Formula 10, $Y'''^-$ may be bis(trifluoromethylsulfonyl)imide (TFSI), bis(fluorosulfonyl)imide, $BF_4^-$ or $CF_3SO_3^-$. Examples of the polymeric ionic liquid include a cation such as poly(1-vinyl-3-alkylimidazolium), poly(1-allyl-3-alkylimidazolium), poly(1-(methacryloyloxy-3-alkylimidazolium), or a combination thereof, and an anion comprising $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, $(CF_3SO_2)(CF_3CO)N^-$, or a combination thereof.

For example, the compound of Formula 10 may be poly(diallyldimethyl ammonium bis(trifluoromethylsulfonyl)imide).

In some embodiments, the polymeric ionic liquid may include a low-molecular weight polymer, an ionic liquid, and a lithium salt. The low-molecular weight polymer may have an ethylene oxide chain. The low-molecular weight polymer may be a glyme. Examples of the glyme include polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 Daltons to about 2,000 Daltons, for example, about 100 Daltons to about 1,000 Daltons, or for example, about 250 Daltons to about 500 Daltons. The ionic liquid may be the same as those listed above in conjunction with the above-described ionic liquid. The protective layer may further include an oligomer. For example, the oligomer in the protective layer may be polyethylene glycol dimethyl ether, polyethylene glycol diethyl ether, or a combination thereof. The oligomer may have a weight average molecular weight of about 200 Daltons to about 2,000 Daltons, for example, about 300 to about 1,800 Daltons, or for example, about 400 Daltons to about 1,500 Daltons. The amount of the oligomer may be about 5 parts to about 50 parts by weight, for example, about 10 parts to about 40 parts by weight, or for example, about 10 parts to about 30 parts by weight, based on 100 parts by weight of the particles in the protective layer. When such an oligomer is added, the protective layer may have improved film formability, mechanical properties, and ion conductivity.

The protective layer may have an ion conductivity as measured at about 25☐ of about $1 \times 10^{-3}$ Siemens per centimeter (S/cm) or greater, or in some embodiments, about $5 \times 10^{-3}$ S/cm or greater.

According to another aspect, provided is a composite electrolyte for a lithium metal battery, the composite electrolyte including a plurality of composite particle and having a Young's modulus of about $10^6$ Pa or greater, wherein the composite particle may include a particle and a coating layer disposed on at least one portion of the particle and including an ion conductive oligomer including an ion conductive unit, an ion conductive polymer including an ion conductive unit, or a combination thereof, wherein the particle may include an organic particle, an inorganic particle, an organic-inorganic particle, or a combination thereof, optionally each having a particle size of greater than about 1 µm and about 100 µm or less.

The composite electrolyte may include an ion conductive polymer, an ionic liquid, or a combination thereof, in addition to the composite particle described above.

The ion conductive polymer may be, for example, any suitable ion conductive polymer, e.g., one used in a lithium metal battery, and may be a homopolymer, a copolymer, a crosslinked polymer, or a combination thereof.

The ion conductive polymer may be, for example, polyethylene oxide, polypropylene oxide, a polyethylene derivative, or poly(ethylene-co-vinyl acetate).

In the composite electrolyte, the amount of the particle in the composite particle may be in a range of about 1 part to about 100 parts by weight, for example, about 1 part to about 50 parts by weight, or for example, about 5 parts to about 30 parts by weight, based on 100 parts by weight of the ion conductive polymer.

The composite electrolyte may further include a lithium salt, an organic solvent, or a combination thereof.

When the composite electrolyte includes a lithium salt, the amount of the lithium salt may be in a range of about 1 part to about 100 parts by weight, for example, about 1 part to about 50 parts by weight, or for example, about 5 parts to about 30 parts by weight, based on 100 parts by weight of the ion conductive polymer.

Any suitable ionic liquid, lithium salt, and organic solvent generally used in a lithium metal battery may be used.

According to another aspect, a lithium metal battery may include a positive electrode; a lithium metal negative electrode including lithium metal or a lithium metal alloy; and the composite electrolyte described above disposed between the positive electrode and the lithium metal negative electrode.

The lithium metal battery may be, for example, a lithium air battery, a lithium ion battery, or a lithium polymer battery, or the like.

In some embodiments, the protective layer may be suitable as a protective layer for a high-voltage lithium secondary battery.

The term "high-voltage" refers to a charging voltage of about 4.0 V to 5.5 V.

According to another aspect, a lithium metal battery may include a positive electrode, a negative electrode for a lithium metal battery according to any of the above-described embodiments, and an electrolyte disposed between the positive electrode and the negative electrode.

The electrolyte may be a composite electrolyte.

The electrolyte may include a liquid electrolyte, a solid electrolyte, a gel electrolyte, a polymeric ionic liquid, or a combination thereof. For example, the electrolyte may be a mixed electrolyte including at least two of these electrolytes. The lithium metal battery may further include a separator.

The liquid electrolyte, polymeric ionic liquid, gel electrolyte, a solid electrolyte, or combination thereof may be between the positive electrode and the electrolyte. The gel electrolyte may be any suitable electrolyte in gel-typed known in the art. For example, the gel electrolyte may include a polymer and a polymeric ionic liquid. For example, the polymer may be a solid graft (block) copolymer electrolyte.

The solid electrolyte may be an organic solid electrolyte or an inorganic solid electrolyte.

Examples of the organic solid electrolyte may include a polyethylene derivative, a polyethylene oxide derivative, a polypropylene oxide derivative, a phosphate ester polymer, a polyester sulfide, a polyvinyl alcohol, a polyvinylidene fluoride, and a polymer including an ionic dissociation group.

Examples of the inorganic solid electrolyte may include $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S$ $GeS_2$ $Ga_2S_3$, $Li_2O$ $11Al_2O_3$, $(Na,Li)_{1+x}Ti_{2-x}Al_x(PO_4)_3$ ($0.1 \le x \le 0.9$), $Li_{1+x}Hf_{2-x}Al_x(PO_4)_3$ ($0.1 \le x \le 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a Na-Silicate, $Li_{0.3}La_{0.5}TiO_3$, $Na_5MSi_4O_{12}$ (where M may be a rare earth element, such as Nd, Gd, or Dy) $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (where $0 \le x \le 0.8$, $0 \le y \le 0.1$, and M may be Nd, Sm, Eu, Gd, Tb, Dy, Ho, Er, Tm or Yb), $Li_{1+x+y}Q_xTi_{2-x}Si_yP_{3-y}O_{12}$ (where $0 < x \le 0.4$, $0 < y \le 0.6$, and Q may be Al or Ga), $Li_6BaLa_2Ta_2O_{12}$, $Li_7La_3Zr_2O_{12}$, $Li_5La_3Nb_2O_{12}$, $Li_5La_3M_2O_{12}$ (M may be Nb or Ta), and $Li_{7+x}A_xLa_{3-x}Zr_2O_{12}$ (where $0 < x < 3$, and A may be Zn).

In some embodiments, the protective layer may include an ionic liquid, a metal salt containing a Group 1 or Group 2 element, a nitrogen-containing additive, or a combination thereof; boron nitride; or a combination thereof.

The metal salt containing a Group 1 or Group 2 element may be a metal salt including Cs, Rb, K, Ba, Sr, Ca, Na, Mg, or a combination thereof. The nitrogen-containing additive may be an inorganic nitrate, an organic nitrate, an inorganic nitrite, an organic nitrite, an organic nitro compound, an organic nitroso compound, a N—O compound, a lithium nitride ($Li_3N$), or a combination thereof.

The metal salt containing a Group 1 or Group 2 element and a nitrogen-containing additive may be insoluble in an organic solvent of a liquid electrolyte. Due to these characteristics, the a metal salt containing a Group 1 or Group 2 element, a nitrogen-containing additive, or a combination thereof, when included in the protective layer, may be stably confined to a surface region of the lithium metal layer with limited mobility, so that migration of lithium ions between electrodes may not be hindered in the protective layer.

The metal of the metal salt containing a Group 1 or Group 2 element has a relatively larger atom size than lithium and thus may have a steric hindrance effect in the protective layer. Due to this steric hindrance, the metal salt containing a Group 1 or Group 2 element may be able to suppress growth of lithium dendrites on the surface of the lithium metal layer. A metal cation (for example, cesium (Cs) or rubidium (Rb) ions) in the metal salt containing a Group 1 or Group 2 element may exhibit an effective reduction potential below the reduction potential of lithium ions and thus may form a positively charged electrostatic shield around the initial growth tip of protuberances formed on the surface of the lithium metal layer without reduction or deposition of the metal salt during lithium deposition. The positively charge electrostatic shield may effectively suppress growth of lithium dendrites on the surface of the lithium metal layer. In order for the metal salt containing a Group 1 or Group 2 element to have an effective reduction potential below the reduction potential of lithium ions, as described above, the amount of the metal salt containing a Group 1 or Group 2 is of importance. For example, the amount of the metal salt containing a Group 1 or Group 2 element may be adjusted to be within a range of about 0.1 parts to about 100 parts by weight, or about 1 part to about 75 parts by weight, or about 10 parts to about 50 parts by weight, based on 100 parts by weight of the particles in the protective layer.

The protective layer of the negative electrode in the lithium metal battery may have excellent mechanical strength and flexibility to suppress lithium dendritic formation. The lithium metal battery may further include an ion-conductive thin film between the lithium metal layer and the protective layer. The ion-conductive thin film may improve the ion conductivity of the protective layer and lithium ion mobility (or lithium ion transference number), and thus reduce an interfacial resistance between the lithium metal layer and the protective layer. For example, the ion-conductive thin film may include lithium nitride ($Li_3N$).

The protective layer of the negative electrode in the lithium metal battery may also chemically improve a deposition/dissolution process of lithium ions to thereby improve deposition morphology of the lithium metal electrode, as compared with a case of forming a conventional protective layer, and consequently increase deposition density on the surface of the lithium metal layer and lithium ion mobility (or transference number). In addition, as described above, at least one of an ionic liquid, a metal salt containing a Group 1 or Group 2 element and a nitrogen-containing additive may be confined to the protective layer on the surface of the lithium metal layer, and thus may be unlikely to be dispersed in the liquid electrolyte or to migrate toward the positive electrode and react with the positive electrode. As a result, the lithium metal battery including the protective layer may have improved rate capability and lifespan characteristics.

For example, the nitrogen-containing additive in the protective layer may include an inorganic nitrate, an organic nitrate, an inorganic nitrite, an organic nitrite, an organic nitro compound, an organic nitroso compound, a N—O compound, lithium nitride (Li3N), or a combination thereof. However, embodiments are not limited thereto.

For example, the inorganic nitrate may be lithium nitrate, potassium nitrate, cesium nitrate, barium nitrate, ammonium nitrate, or a combination thereof. For example, the organic nitrate may be dialkyl imidazolium nitrate, guanidine nitrate, ethyl nitrate, propyl nitrate, butyl nitrate, pentyl nitrate, octyl nitrate, or a combination thereof. For example, the organic nitrite may be ethyl nitrite, propyl nitrite, butyl nitrite, pentyl nitrite, octyl nitrite, or a combination thereof.

For example, the organic nitroso compound may be nitromethane, nitropropane, nitrobutane, nitrobenzene, dinitrobenzene, nitrotoluene, dinitrotoluene, nitropyridine, or a combination thereof. For example, the N—O compound may be pyridine N-oxide, alkylpyridine N-oxide, tetramethyl piperidine N-oxyl (TEMPO), or a combination thereof.

In some embodiments, the nitrogen-containing additive in the protective layer may be $LiNO_3$, $Li_3N$, or a combination thereof, and the Group 1 or Group 2 element-containing metal salt in the protective layer may be cesium bis(trifluoromethylsulfonyl)imide (CsTFSI), $CsNO_3$, $CsPF_6$, CsFSI, $CsAsF_6$, $CsClO_4$, $CsBF_4$, or a combination thereof. For example, the Group 1 or Group 2 element-containing metal salt may be CsTFSI.

The amount of the at least one of a metal salt containing a Group 1 or Group 2 element and a nitrogen-containing additive in the protective layer may be in a range of about 0.1 parts to about 100 parts by weight, or for example, about 0.1 parts to about 30 parts by weight, based on 100 parts by weight of the particles in the protective layer. When the amount of the at least one of a metal salt containing a Group 1 or Group 2 element and a nitrogen-containing additive is within any of these ranges, the lithium metal battery may have a lithium dendritic growth suppression effect, a reduced interfacial resistance between the surface of the lithium metal layer and the protective layer, and improved lithium ion mobility.

In some embodiments, the protective layer may include only a metal salt containing a Group 1 or Group 2 element. In this regard, the amount of the metal salt containing a Group 1 or Group 2 element may be in a range of about 0.1 parts to about 100 parts by weight, for example, about 0.1 parts to about 50 parts by weight, or for example, about 0.1 parts to about 30 parts by weight, based on 100 parts by weight of particles in the protective layer.

In some embodiments, the protective layer may include only a nitrogen-containing additive. The amount of the nitrogen-containing additive may be in a range of about 0.1 parts to about 100 parts by weight, for example, about 0.1 parts to about 50 parts by weight, or for example, about 0.1 parts to about 30 parts by weight, based on 100 parts by weight of the particles in the protective layer.

In some embodiments, the protective layer may include both a metal salt containing a Group 1 or Group 2 element and a nitrogen-containing additive. In this regard, the amount of the metal salt containing a Group 1 or Group 2 element may be about 0.01 parts to about 99.99 parts by weight, in some embodiments, about 0.05 parts to about 50 parts by weight, or in some embodiments, about 0.1 parts to about 30 part by weight, based on 100 parts by weight of the particles in the protective layer. The amount of the nitrogen-containing additive may be about 0.01 parts to about 99.99 parts by weight, in some embodiments, about 0.05 parts to about 50 parts by weight, or in some embodiments, about 0.1 parts to about 30 parts by weight, based on 100 parts by weight of the particles in the protective layer.

In some embodiments, a mixed weight ratio of the metal salt containing a Group 1 or Group 2 element to the nitrogen-containing additive in the protective layer may be about 1:9 to about 9:1, in some other embodiments, about 1:2 to about 2:1, or in some embodiments, about 1:1. When the mixed weight ratio of the metal salt containing a Group 1 or Group 2 element to the nitrogen-containing additive is within any of these ranges, due to good deposition density on the surface of the lithium metal layer and improved lithium ion mobility characteristics in the electrolyte, the lithium metal battery may have improved rate capability and lifespan characteristics.

The lithium metal layer of the negative electrode in the lithium metal battery may be lithium metal or a lithium metal alloy. The lithium metal battery may further include a liquid electrolyte between the lithium metal layer and the positive electrode, the liquid electrolyte including an organic solvent, an ionic liquid, a lithium salt, or a combination thereof.

A lithium metal battery with improved capacity retention rate may be manufactured using a negative electrode according to any of the above-described embodiments. The lithium metal battery according to any one of the above-described embodiments may have good voltage characteristics, high capacity, and high energy density, and thus may be used in a wide variety of applications including mobile phones, laptop computers, storage batteries for power generating units using wind power or sunlight, electric vehicles, uninterruptable power supplies (UPS), household storage batteries, and the like.

FIGS. 1H to 1K are schematic views illustrating structures of an embodiment of a lithium metal battery.

As shown in FIG. 1H, a lithium metal battery may include a positive electrode 21, a negative electrode 22, and an electrolyte 24 disposed therebetween. A protective layer 23 may be between the electrolyte 24 and the negative electrode 22. The electrolyte 24 may include a liquid electrolyte, a polymeric ionic liquid, a solid electrolyte, a gel electrolyte, or a combination thereof. The lithium metal battery may further include a separator.

The protective layer 23 may be disposed on at least a portion of the negative electrode 22, so that the surface of the negative electrode 22 may become mechanically and electrochemically stable. As a result, during charging and discharging the lithium metal battery, dendritic formation on the surface of the negative electrode 22 may be suppressed, and interfacial stability between the negative electrode 22 and the electrolyte 24 may be improved. Thus, the lithium metal battery may have improved cycle characteristics.

The electrolyte 24 may have a two-layer stack structure including a liquid electrolyte 24a and a solid electrolyte 24b that may be sequentially stacked, as illustrated in FIG. 1I. The liquid electrolyte 24a may be adjacent to the protective layer 23. The lithium metal battery may have a stack structure of negative electrode/protective layer/electrolyte (liquid electrolyte/solid electrolyte)/positive electrode in this stated order.

Referring to FIG. 1J, a lithium metal battery according to another embodiment may further include a separator 24c. For example, the separator may be a monolayer of polyethylene, polypropylene, polyvinylidene fluoride, or a combination thereof, or a multilayer including at least two layers of polyethylene, polypropylene, polyvinylidene fluoride, or a combination thereof. For example, the separator may be a mixed multilayer structure, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

Referring to FIG. 1K, a lithium metal battery according to another embodiment may include the liquid electrolyte 24a. The liquid electrolyte 24a may have a composition which is the same or different as the composition of the liquid electrolyte included in the protective layer 23.

FIG. 1L is a schematic view illustrating a structure of an embodiment of a lithium metal battery 30.

The lithium metal battery 30 may include a positive electrode 31, a negative electrode 32 according to any of the above-described embodiments, and a battery case 34 accommodating the positive electrode 31 and the negative electrode 32.

In the embodiments of FIGS. 1H to 1L, the positive electrode 21 or 31 may be a porous positive electrode. The porous positive electrode may be a positive electrode including pores, or any positive electrode that allows permeation of liquid electrolyte thereinto by capillary action.

For example, the porous positive electrode may be a positive electrode that may be obtained by coating a positive active material composition including a positive active material, a conductive agent, a binder, and a solvent, and drying the resulting structure. The resulting positive electrode may include pores among particles of the positive active material. The porous positive electrode may be impregnated with liquid electrolyte.

In some embodiments, a positive electrode may include a liquid electrolyte, a gel electrolyte, or a solid electrolyte. The liquid electrolyte, the gel electrolyte, and the solid electrolyte may be any suitable electrolyte for lithium metal batteries that may not react with the positive active material, and thus prevent deterioration of the positive active material during charging and discharging.

A composite electrolyte for a lithium metal battery according to any of the above-described embodiments may also be applicable to a three-dimensional (3D) lithium metal battery.

Referring to FIG. 1O, a 3D metal air battery 200 may include a plurality of gas diffusion layers 130a and 130b spaced apart from each other in a thickness direction of the 3D metal air battery 200; a plurality of first positive electrodes 120a and 120c respectively on surfaces 135a and 135b of the plurality of gas diffusion layers 130a and 130b; and a plurality of second positive electrodes 120b and 120d respectively on other surfaces 137a and 137b of the plurality of gas diffusion layers 130a and 130b, wherein an ion conductive layer 110 may be disposed to be repetitively bent at 180 degrees and be in contact with surfaces 125a, 125b, 125c, and 125d of the plurality of first positive electrodes 120a and 120c and the plurality of second positive electrodes 120b and 120d, a negative electrode 100 may be disposed to be repetitively bent at 180 degrees in the same pattern as the ion conductive layer 110 such that the negative electrode 100 may be in contact with the ion conductive layer 110, and the negative electrode 100 may be disposed to be bent at 180 degrees between the plurality of gas diffusion layers 130a and 130b that are adjacent to each other such that the negative electrode 100 may be stacked upon itself.

As for the ion conductive layer 110, a composite electrolyte according to any of the above-described embodiments may be used.

In the 3D metal air battery 200, the plurality of first positive electrodes 120a and 120c and the plurality of second positive electrodes 120b and 120d may not be disposed on side surfaces 131a and 131b of the plurality of gas diffusion layers 130a and 130b, and thus, even if the ion conductive layer 110 cracks, a short circuit between the negative electrode 100 and the first and second positive electrodes 120a and 120b may be prevented.

The 3D metal air battery 200 may include a plurality of intermediate layers 140a, 140b, and 140c including a reinforcing agent, which are disposed such that the plurality of intermediate layers 140a, 140b, and 140c may be in contact with all bent portions 111 and 112 of the ion conductive layer 110. The 3D metal air battery 200 may include the plurality of intermediate layers 140a, 140b, and 140c, thereby preventing cracking of the ion conductive layer 110 and a short circuit between the negative electrode 100 and the plurality of positive electrodes 120a and 120b.

Each element of a lithium metal battery including a negative electrode according to any of the embodiments, and a method of manufacturing the lithium metal battery now will be described in further detail.

The positive active material for manufacturing a positive electrode may include lithium cobalt oxide, lithium nickel cobalt manganese oxide, lithium nickel cobalt aluminum oxide, lithium iron phosphorous oxide, lithium manganese oxide, or a combination thereof, but embodiments are not limited thereto. Any suitable positive active materials available in the art may be used.

For example, the positive active material may be a compound represented by one of the following formulae: $Li_aA_{1-b}B'_bD_2$ (wherein $0.90 \leq a \leq 1.8$ and $0 \leq b \leq 0.5$); $Li_aE_{1-b}B'_bO_{2-c}D_c$ (wherein $0.90 \leq a \leq 1.8$, $0 \leq b \leq 0.5$, and $0 \leq c \leq 0.05$); $LiE_{2-b}B'_bO_{4-c}D_c$ (wherein $0 \leq b \leq 0.5$ and $0 \leq c \leq 0.05$); $Li_aNi_{1-b-c}Co_bB'_cD_\alpha$ (wherein $0.90 \leq a \leq 1.8$, $0 \leq b \leq 0.05$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_{1-b-c}Mn_bB'_cD_\alpha$ (wherein $0.9 \leq a \leq 1.8$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1.8$, $0 \leq b \leq 0.5$, $0 \leq c \leq 0.05$, and $0 < \alpha < 2$); $Li_aNi_bE_cG_dO_2$ (wherein $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1.8$ and $0.001 \leq b \leq 0.1$); $Li_aCoG_bO_2$ (wherein $0.90 \leq a \leq 1.8$ and $0.001 \leq b \leq 0.1$); $Li_aMnG_bO_2$ (wherein $0.90 \leq a \leq 1.8$ and $0.001 \leq b \leq 0.1$); $Li_aMn_2G_bO_4$ (wherein $0.90 \leq a \leq 1.8$ and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \leq f \leq 2$); $Li_{(3-f)}Fe_2(PO_4)_3$ (wherein $0 \leq f \leq 2$); and $LiFePO_4$.

In the foregoing formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof.

For example, the positive active material may be a compound represented by Formula 11, a compound represented by Formula 12, or a compound represented by Formula 13.

$$Li_aNi_bCo_cMn_dO_2 \quad \text{Formula 11}$$

In Formula 11, $0.90 \leq a \leq 1.8$, $0 \leq b \leq 0.9$, $0 \leq c \leq 0.5$, and $0 \leq d \leq 0.5$.

$$Li_2MnO_3 \quad \text{Formula 12}$$

$$LiMO_2 \quad \text{Formula 13}$$

In Formula 13, M may be Mn, Fe, Co, or Ni.

The positive electrode of the lithium metal battery may be manufactured as follows.

A positive active material, a binder, and a solvent are mixed together to prepare a positive active material composition.

A conductive agent may be further added into the positive active material composition.

The positive active material composition is directly coated on a metallic current collector and dried to prepare a positive electrode plate. Alternatively, the positive active material composition may be cast on a separate support to form a positive active material film, which may then be separated from the support and laminated on a metallic current collector to prepare a positive electrode plate.

The binder is a composition that facilitates binding between an active material and a conductive material and binding with a current collector. Non-limiting examples of the binder include polyvinylidene fluoride (PVDF), polyvinyl alcohol, carboxymethylcellulose (CMC), starch, hydroxypropylcellulose, cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, and various copolymers. The amount of the binder added may be from about 1 part to about 50 parts by weight based on 100 parts by weight, based on the total weight of the positive active material. The amount of the binder may be from about 2 parts to about 5 parts by weight based on 100 parts by weight of the total weight of the positive active material. When the amount of the binder is within any of these ranges, a binding force of the positive active material layer to the current collector may be satisfactory.

The conductive agent may be any suitable material having suitable electrical conductivity without causing an undesirable chemical change in a battery. Examples of the conductive agent include graphite, such as natural graphite or artificial graphite; a carbonaceous material, such as carbon black, acetylene black, Ketjen black, channel black, furnace black, lamp black, or summer black; conductive fibers, such as carbon fibers or metal fibers; fluorinated carbon; a metal powder, aluminum, or nickel; a conductive whisker, such as zinc oxide or potassium titanate; a conductive metal oxide, such as titanium oxide; and a conductive material, such as a polyphenylene derivative.

The amount of the conductive agent added may be from about 1 part to about 10 parts by weight based on 100 parts by weight, based on the total weight of the positive active material. The amount of the conductive agent may be from about 2 parts to about 5 parts by weight based on 100 parts by weight of the total weight of the positive active material. When the amount of the conductive agent is within any of these ranges, the final positive electrode may have good conductivity characteristics.

Non-limiting examples of the solvent include N-methylpyrrolidone.

The amount of the solvent may be in a range of about 100 parts to about 2,000 parts by weight based on 100 parts by weight of the total weight of the positive active material. When the amount of the solvent is within this range, a process for forming the positive active material layer may be easily carried out.

The amounts of the positive active material, the conductive agent, the binder, and the solvent may be those levels as used in the manufacture of lithium metal batteries in the art. At least one of the conductive agent, the binder, and the solvent may be omitted depending on the use and structure of a lithium metal battery.

The negative electrode may be, for example, a lithium metal thin film or a lithium metal alloy thin film, as described above.

A lithium metal alloy for the negative electrode may include lithium, and a metal/metalloid alloyable with lithium. Examples of the metal/metalloid alloyable with lithium are Si, Sn, Al, Ge, Pb, Bi, Sb, a Si—Y' alloy (wherein Y' is an alkaline metal, an alkaline earth metal, a Group 13 to Group 16 element, a transition metal, a rare earth element, or a combination thereof, except for Si), a Sn—Y' alloy (wherein Y' is an alkaline metal, an alkaline earth metal, a Group 13 to Group 16 element, a transition metal, a rare earth element, or a combination thereof, except for Sn). Y' may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof.

The electrolyte may include a separator and/or a lithium salt-containing nonaqueous electrolyte which are suitable for use in lithium metal batteries in the art.

The separator may be an insulating thin film having high ion permeability and high mechanical strength. The separator may have a pore diameter of about 0.01 µm to about 10 µm, and a thickness of about 5 µm to about 20 µm. Non-limiting examples of the separator are olefin-based polymers, such as polypropylene, and sheets or non-woven fabric made of glass fiber or polyethylene. When a lithium metal battery contains a solid polymer electrolyte, the solid polymer electrolyte may also serve as the separator.

For example, the separator may be a monolayer or a multilayer including at least two layers of polyethylene, polypropylene, polyvinylidene fluoride, or a combination thereof. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene.

The lithium salt-containing nonaqueous electrolyte may include a nonaqueous electrolyte and a lithium salt.

The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvent. For example, the organic solvent may be propylene carbonate, ethylene carbonate, fluoroethylene carbonate, butylene carbonate, dimethyl carbonate, diethyl carbonate, methyl ethyl carbonate, methylpropyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), LiCl, LiI, or a combination thereof. For example, to improve charge-discharge characteristics and flame retardancy of a lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the nonaqueous electrolyte. In some embodiments, to provide nonflammable characteristics, a halogen-containing solvent such as carbon tetrachloride, ethylene trifluoride, or the like may be further added to the nonaqueous electrolyte.

For example, the lithium metal battery according to any one of the above-described embodiments may have improved capacity and improved lifespan characteristics, and thus may be used in a battery cell for use as a power source of a small device. The lithium metal battery may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but embodiments are not limited thereto.

The term "alkyl" group as used herein refers to a completely saturated branched or unbranched (or straight-chained or linear) hydrocarbon group.

Non-limiting examples of the "alkyl" group include methyl, ethyl, n-propyl, isopropyl, n-butyl, isobutyl, sec-butyl, n-pentyl, isopentyl, neopentyl, n-hexyl, 3-methylhexyl, 2,2-dimethylpentyl, 2,3-dimethylpentyl, and n-heptyl.

At least one hydrogen atom in the "alkyl" group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C3-C20 heteroaryl group, a C4-C20 heteroarylalkyl group, a C3-C20 heteroaryloxy group, a C4-C20 heteroaryloxyalkyl group, or a C4-C20 heteroarylalkoxy group.

The term "halogen atom" indicates fluorine, bromine, chloride, iodine, and the like.

The term "alkenyl" group as used herein refers to a branched or unbranched hydrocarbon group that includes at least one carbon-carbon double bond. Non-limiting examples of the alkenyl group include vinyl, allyl, butenyl, isopropenyl, and isobutenyl. At least one hydrogen atom in the alkenyl group may be substituted with any of the aforementioned substituents for the alkyl group.

The term "alkynyl" group as used herein refers to a branched or unbranched hydrocarbon group that includes at least one carbon-carbon triple bond. Non-limiting examples of the "alkynyl" group include ethynyl, butynyl, isobutynyl, and propynyl.

At least one hydrogen atom in the "alkynyl" group may be substituted with any of the aforementioned substituents for the alkyl group.

The term "aryl" group as used herein is construed as including a group that includes an aromatic ring optionally fused to at least one carbocyclic ring. Non-limiting examples of the "aryl" group include phenyl, naphthyl, and tetrahydronaphthyl.

At least one hydrogen atom of the "aryl" group may be substituted with any of the aforementioned substituents for the alkyl group.

The term "heteroaryl" group as used herein refers to an aromatic, monocyclic or bicyclic organic group including at least one of nitrogen (N), oxygen (O), phosphorous (P), or sulfur (S) as the heteroatom, wherein the rest of the cyclic atoms are all carbon atoms. The heteroaryl group may include, for example, one to five heteroatoms, and in some embodiments, may include a five- to ten-membered ring. In the heteroaryl group, S or N may be present in various oxidized forms.

Non-limiting examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, pyrazine-2-yl, pyrazine-4-yl, pyrazine-5-yl, pyrimidine-2-yl, pyrimidine-4-yl, and pyrimidine-5-yl.

The term "heteroaryl" group as used herein is construed as including a heteroaromatic ring that is optionally fused to at least one of an aryl group, a cycloaliphatic group, and a heterocyclic group.

The term "carbocyclic" group as used herein refers to a saturated or partially unsaturated non-aromatic monocyclic, bicyclic or tricyclic hydrocarbon group.

Non-limiting examples of the monocyclic hydrocarbon group include cyclopentyl, cyclopentenyl, cyclohexyl, and cyclohexenyl. Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, or bicyclo[2.2.2]octyl. Non-limiting examples of the tricyclic hydrocarbon include adamantyl.

The term "heterocyclic" group as used herein refers to a C5-C20 cyclic hydrocarbon group, for example, C4-C10 cyclic hydrocarbon group, including at least one heteroatom. For example, the heteroatom may be S, N, O, S, or B.

The terms "alkoxy," "aryloxy," and "heteroaryloxy," as used herein refer to alkyl, aryl, and heteroaryl groups, which are bound to an oxygen atom, respectively.

One or more embodiments of the present disclosure will now be described in further detail with reference to the following Examples and Comparative Examples. However, these examples are only for illustrative purposes and are not intended to limit the scope of the one or more embodiments of the present disclosure.

EXAMPLES

Preparation Example 1: Preparation of Composite Particle 10 parts by weight of polyethylene glycol (PEG 200, weight average molecular weight: 200) was added to ethanol, based on 100 parts by weight of ethanol. Next, poly(styrene-b-divinylbenzene) block copolymer microspheres (average particle diameter: about 3 µm, available from EPRUI Nanoparticles & Microspheres Co. Ltd.) was added to the mixture, and then mixed together to thereby obtain a composite particle composition.

In the poly(styrene-b-divinylbenzene) block copolymer, the mixed weight ratio of the polystyrene block to the polydivinylbenzene block was about 98:2. The poly(styrene-b-divinylbenzene) block copolymer had a weight average molecular weight of about 100,000 Daltons.

The solvent was removed from the composite particle composition using a rotary evaporator to thereby prepare composite particles having a coating layer containing PEG200 formed on poly(styrene-b-divinylbenzene) microspheres. In the composite particles, the thickness of the coating layer containing PEG200 was about 100 nm, and the amount of the PEG 200 was about 10 parts by weight, based on 100 parts by weight of the poly(styrene-b-divinylbenzene) microspheres.

Preparation Example 2: Preparation of Composite Particle

Composite particles were prepared in substantially the same manner as in Preparation Example 1, except that upon preparing the composite particle composition, polyethylene glycol (PEG 600, weight average molecular weight: 600) was used in place of polyethylene glycol (PEG 200, weight average molecular weight: 200 Daltons). In the composite particles, the thickness of the coating layer containing PEG600 was about 200 nm, and the amount of the PEG 600 was about 20 parts by weight, based on 100 parts by weight of the poly(styrene-b-divinylbenzene) microspheres.

Preparation Example 3: Preparation of Composite Particle

Composite particles were prepared in substantially the same manner as in Preparation Example 1, except that the thickness of the coating layer in the composite particles was adjusted to be about 50 nm, and the amount of PEG 200 was adjusted to be about 3 parts by weight, based on 100 parts by weight of the poly(styrene-b-divinylbenzene) microspheres.

Preparation Example 4: Preparation of Composite Particle

Composite particles were prepared in substantially the same manner as in Preparation Example 1, except that that the thickness of the coating layer in the composite particles was adjusted to be about 200 nm, and the amount of PEG 200 was adjusted to be about 30 parts by weight, based on 100 parts by weight of the poly(styrene-b-divinyl benzene) microspheres.

Preparation Examples 5 to 7: Preparation of Composite Particle

Composite particles were prepared in substantially the same manner as in Preparation Example 1, except that upon preparing the composite particle composition, polysiloxane, poly(oxyethylene)methacrylate, and poly(ethylene glycol) diacrylate (PEGDA) were used instead of polyethylene glycol, respectively.

Example 1: Manufacture of Negative Electrode

The composite particles prepared in Preparation Example 1 were added with anhydrous tetrahydrofuran to thereby obtain 5 wt % of a mixture containing the composite particles.

The mixture was added with lithium bis(fluorosulfonyl) imide (LiFSI, $LiN(SO_2F)_2$) to thereby obtain a protective layer-forming composition. Here, the amount of LiFSI was about 30 parts by weight, based on 100 parts by weight of the poly(styrene-b-divinylbenzene) copolymer used in the preparation of the composite particles.

The protective layer-forming composition was coated on a lithium metal thin film (having a thickness of about 20 µm), which is on a copper thin film, to a thickness of about 3 µm using a doctor blade. The coated resultant was dried at a temperature of about 25° C., and then dried at a temperature of about 40° C. for about 24 hours.

Aside from the foregoing process, diethylene glycol diacrylate (DEGDA) and 2-hydroxy-2-methylpropiophenone (HMPP) was dissolved in tetrahydrofuran to prepare 30 wt % of a DEGDA solution. The amount of the DEGDA was about 30 parts by weight, based on 100 parts by weight of the poly(styrene-b-divinylbenzene) block copolymer microspheres, and the amount of the HMPP was about 0.7 parts by weight based on 100 parts by weight of total weight of the DEGDA solution. This solution was cast on the coated and dried resultant. Next, the cast resultant was dried at a temperature of about 25° C. for 12 hours, followed by irradiation with ultraviolet (UV) light at a temperature of about 40° C. for 1 hour, thereby completing the manufacture of a negative electrode including a protective layer formed on a lithium metal thin film, the protective layer including the composite particles (including a coating layer disposed on the microspheres) and a crosslinked material of DEGDA disposed between the composite particles. The amount of the crosslinked material of DEGDA was about 20 parts by weight, based on 100 parts by weight of the poly(styrene-b-divinylbenzene) block copolymer microspheres.

Example 1A: Preparation of Composite Electrolyte

The composite particles prepared in Preparation Example 1 were added with anhydrous tetrahydrofuran to thereby obtain 5 wt % of a mixture containing the composite particles.

Polyethylene oxide (PEO) was mixed with acetonitrile to obtain 5 wt % of a PEO acetonitrile solution. To the PEO acetonitrile solution, lithium bis(fluorosulfonyl) imide (LiFSI, $LiN(SO_2F)_2$), N-methyl-N-propyl pyrrolidinium bis(fluorosulfonyl)imide (Pyr13FSI), i.e., an ionic liquid, and the mixture containing the composite particles, were added to prepare a composite electrolyte-forming composition.

In the composite electrolyte-forming composition, the amount of the poly(styrene-b-divinylbenzene) copolymer was about 15 parts by weight, based on 100 parts by weight of PEO. The amount of LiFSI was about 30 parts by weight, based on 100 parts by weight of PEO. The amount of Pyr13FSI was about 40 parts by weight based on 100 parts by weight of PEO.

The composite electrolyte-forming composition was cast on a substrate followed by drying at a temperature of about 40☐ and detaching the resultant structure from the substrate, to thereby forming a composite electrolyte.

Examples 2 and 3: Manufacture of Negative Electrodes

Negative electrodes were manufactured in substantially the same manner as in Example 1, except that the thicknesses of the protective layers were adjusted to about 1 µm and 8 µm, respectively, in the manufacture process of the protective layer.

Example 4: Manufacture of Negative Electrode

A negative electrode was manufactured in substantially the same manner as in Example 1, except that a poly (acrylonitrile-b-butadiene-b-styrene) block copolymer was further added in preparing the protective layer-forming composition.

The amount of poly(acrylonitrile-b-butadiene-b-styrene) block copolymer was about 2 parts by weight, based on 100 parts by weight of the poly(styrene-b-divinylbenzene) copolymer used in the preparation of the composite particles. In addition, the weight average molecular weight of the poly (acrylonitrile-b-butadiene-b-styrene) copolymer was about 100,000 Daltons, and the mixed weight ratio of polyacrylonitrile block to polybutadiene block to polystyrene block was about 25:25:50.

Example 5: Manufacture of Negative Electrode

A negative electrode was manufactured in substantially the same manner as in Example 4, except that the amount of the poly(acrylonitrile-b-butadiene-b-styrene) copolymer was adjusted to about 1 part by weight, based on 100 parts by weight of the poly(styrene-b-divinylbenzene) copolymer.

Examples 6 and 7: Manufacture of Negative Electrodes

Negative electrodes were manufactured in substantially the same manner as in Example 1, except that the average particle diameters of poly(styrene-b-divinylbenzene) copolymer microspheres were adjusted to about 1.3 µm and 8 µm, respectively.

Example 8: Manufacture of Negative Electrode

A negative electrode was manufactured in substantially the same manner as in Example 1, except that the poly (styrene-b-divinylbenzene) copolymer microspheres having a mixed weight ratio of the polystyrene block to the polydivinylbenzene block of about 80:20 was used in place of the poly(styrene-b-divinylbenzene) copolymer microspheres having a mixed weight ratio of about 98:2 (49:1).

Example 9: Manufacture of Lithium Metal Battery

The protective layer-forming composition prepared in Example 1 was coated on a lithium metal thin film (having a thickness of about 20 µm) to a thickness of about 5 µm using a doctor blade. The coated resultant was dried at a temperature of about 25° C., and thermally treated in a vacuum at a temperature of about 40° C.

Aside from the foregoing process, diethylene glycol diacrylate (DEGDA) and 2-hydroxy-2-methylpropiophenon (HMPP) was dissolved in tetrahydrofuran to prepare 30 wt % of a DEGDA solution. The amount of the DEGDA was about 30 parts by weight, based on 100 parts by weight of the poly(styrene-b-divinylbenzene) block copolymer microspheres, and the amount of the HMPP was about 0.7 parts by weight based on 100 parts by weight of total weight of the DEGDA solution. This solution was cast on the coated and dried resultant. Next, the cast resultant was dried at a temperature of about 25° C. for 12 hours, followed by irradiation with ultraviolet (UV) light at a temperature of about 40° C. for 1 hour, thereby completing the manufacture of a negative electrode including a protective layer formed on a lithium metal thin film, the protective layer including the composite particles (including a coating layer disposed on the microspheres and the upper surfaces of the microspheres) and a crosslinked material of DEGDA disposed between the composite particles. The amount of the crosslinked material of DEGDA was about 20 parts by weight, based on 100 parts by weight of the poly(styrene-b-divinylbenzene) block copolymer microspheres.

Aside from the foregoing process, $LiNi_{0.6}Co_{0.2}Al_{0.2}O_2$ (NCA), a conductive agent (Super-P; available from Timcal Ltd.), polyvinylidene fluoride (PVdF), and N-methylpyrrolidone were mixed together to prepare a positive active material layer-forming composition. In the positive active material layer-forming composition, the mixed weight ratio of NCA to conductive agent to PVDF was about 97:1.5:1.5, and the amount of N-methylpyrrolidone was about 137 grams (g) with respect to 97 g of NCA.

The positive active material layer-forming composition was coated on an aluminum foil (having a thickness of about 15 μm), dried at a temperature of about 25□, and further dried in a vacuum at a temperature of about 110° C., to manufacture a positive electrode.

Figure 5:
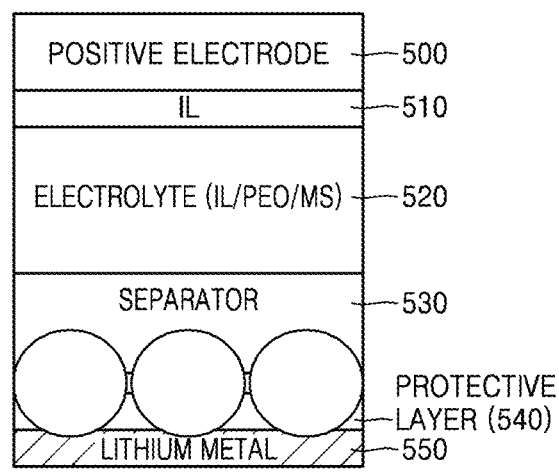
FIGS. 5 and 6 respectively illustrate a stacked structure of the lithium metal batteries prepared in Examples 9 and 9A.

The positive electrode obtained as described above was impregnated with N-methyl-N-propyl pyrrolidinium bis (fluorosulfonyl) imide (Pyr13FSI), i.e., an ionic liquid. Then, the composite electrolyte prepared in Example 1A and a polyethylene separator (having a porosity of about 48%) were disposed between the positive electrode and a negative electrode (having a thickness of about 25 μm), to thereby complete the manufacture of a lithium metal battery (i.e., a pouch cell having about 40 milliampere-hours (mAh)) having a laminate structure as illustrated in FIG. 5. As shown in FIG. 5, the laminate structure includes a positive electrode 500, an interfacial layer 510, an electrolyt 520, a separator 530, a protective layer 540, and a lithium metal electrode 550. The structure of the PYR13 cation is as follows:

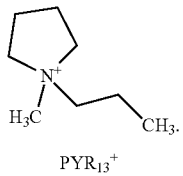

$PYR_{13}^+$

Figure 6:
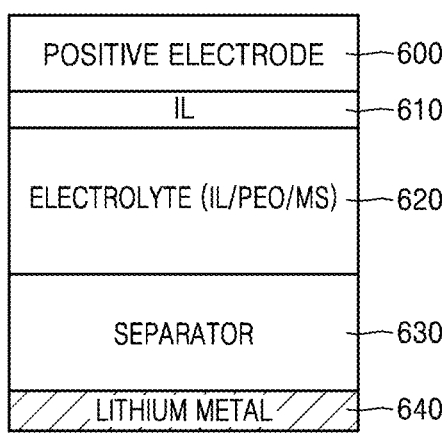

A liquid electrolyte was added between the positive electrode and the lithium metal negative electrode, to thereby complete the manufacture of a lithium metal battery having a laminate structure as illustrated in FIG. 6. The liquid electrolyte was an electrolyte including 1.0 molar (M) $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Example 9A: Manufacture of Lithium Metal Battery

A lithium metal battery having a laminate structure as illustrated in FIG. 6 was manufactured in substantially the same manner as in Example 9, except that a protective layer was not on the lithium metal thin film (having a thickness of about 20 μm). Shown in FIG. 6 is a positive electrode 600, an interfacial layer 610, an electrolyte 620, a separator 630, and a lithium metal electrode 640. The manufacture process of the lithium metal battery is as follows:

$LiNi_{0.6}Co_{0.2}Al_{0.2}O_2$(NCA), a conductive agent (Super-P; available from Timcal Ltd.), polyvinylidene fluoride (PVdF), and N-methylpyrrolidone were mixed together to prepare a positive active material layer-forming composition. In the positive active material layer-forming composition, the mixed weight ratio of NCA to conductive agent to PVDF was about 97:1.5:1.5, and the amount of N-methylpyrrolidone was about 137 g with respect to 97 g of NCA.

The positive active material layer-forming composition was coated on an aluminum foil (having a thickness of about 15 μm), dried at a temperature of about 25□, and further dried in a vacuum at a temperature of about 110□, to manufacture a positive electrode.

The positive electrode obtained as described above was impregnated with N-methyl-N-propyl pyrrolidinium bis (fluorosulfonyl) imide (Pyr13FSI), i.e., an ionic liquid. Then, the composite electrolyte prepared in Example 1A and a polyethylene separator (having a porosity of about 48%) were disposed between the positive electrode and a lithium metal thin film, i.e., a negative electrode (having a thickness of about 20 μm), to thereby complete the manufacture of a lithium metal battery (i.e., a pouch cell having about 40 mAh) having a laminate structure as illustrated in FIG. 6.

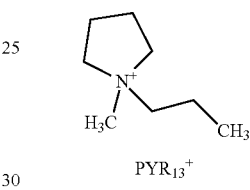

$PYR_{13}^+$

A liquid electrolyte was added between the positive electrode and the lithium metal negative electrode, to thereby complete the manufacture of a lithium metal battery having a laminate structure as illustrated in FIG. 5. The liquid electrolyte was an electrolyte including 1.0 M LiN $(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Example 9B: Manufacture of Lithium Symmetric Cell

The composite particles prepared in Preparation Example 1 were added with anhydrous tetrahydrofuran to thereby obtain 5 wt % of a mixture containing the composite particles.

Polyethylene oxide (PEO) was mixed with acetonitrile to obtain 5 wt % of a PEO acetonitrile solution. To the PEO acetonitrile solution, the mixture containing the composite particles, lithium bis(fluorosulfonyl) imide (LiFSI, LiN $(SO_2F)_2$), N-methyl-N-propyl pyrrolidinium bis(fluorosulfonyl)imide (Pyr13FSI), i.e., an ionic liquid, and triethylene glycol dimethyl ether (G3) were added to prepare a protective layer-forming composition.

In the protective layer-forming composition, the amount of the poly(styrene-b-divinylbenzene) copolymer was about 15 parts by weight, the amount of LiFSI was about 30 parts by weight, the amount of the ionic liquid was about 50 parts by weight, and the amount of G3 was about 20 parts by weight, based on 100 parts by weight of PEO. The amount of Pyr13FSI was about 40 parts by weight based on 100 parts by weight of PEO.

The protective layer-forming composition was cast on a lithium metal thin film (having a thickness of about 20 μm), followed by drying at a temperature of about 40° C., thereby completing the manufacture of a lithium negative electrode.

Figure 8A:
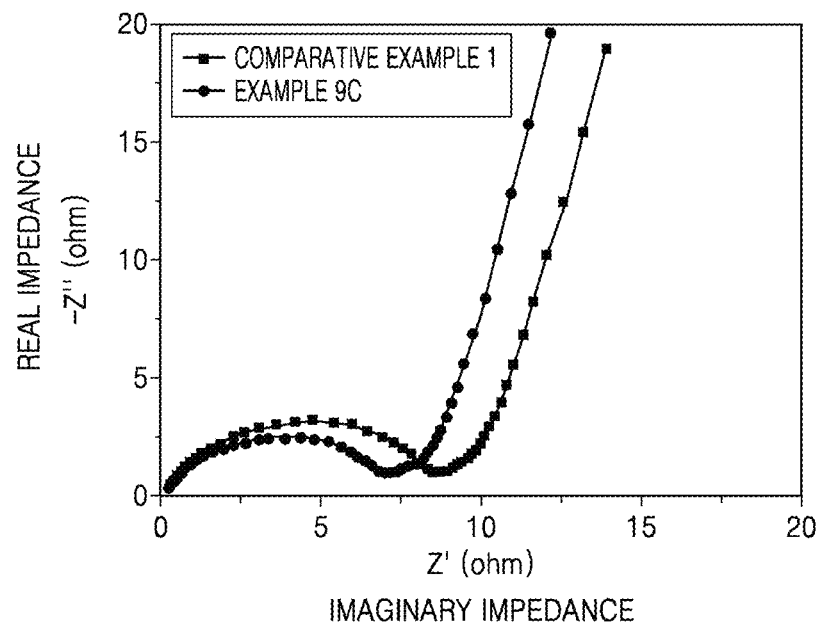
FIG. 8A is a Nyquist graph of real impedance (Z", ohm) versus imaginary impedance (Z', ohm), illustrating the results of an impedance measurement performed after 24 hours from the manufacture of the lithium metal batteries of Example 9C and Comparative Example 1.
Figure 8B:
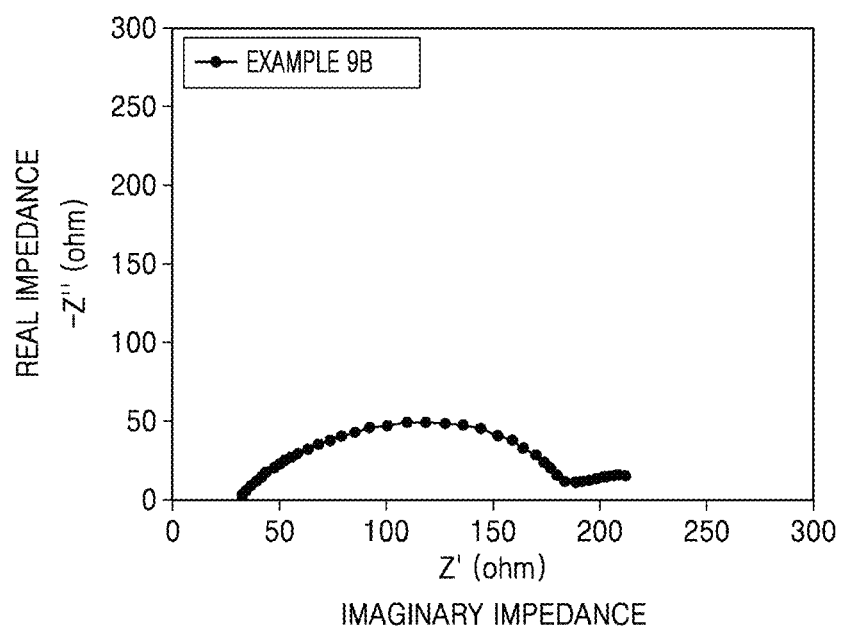
FIG. 8B is a Nyquist graph of real impedance (Z", ohm) versus imaginary impedance (Z', ohm), illustrating the results of an impedance measurement performed after 24 hours from the manufacture of the lithium metal battery of Example 9B.
Figure 8C:
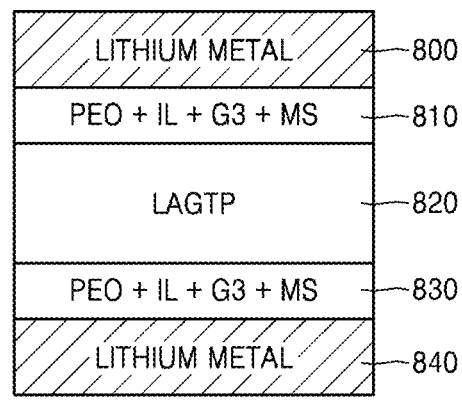
FIG. 8C illustrates a stacked structure of the lithium symmetric cell prepared in Example 9B.

A $Li_{1.4}Al_{0.4}Ge_{0.2}Ti_{1.4}(PO_4)_3$ (LAGTP) electrolyte was disposed on the protective layer of the lithium negative electrode, and then a lithium negative electrode (lithium metal thin film having a protective layer) was disposed on the LAGTP electrolyte, thereby completing the manufacture of a lithium symmetric cell having a laminate structure, as illustrated in FIG. 8C. Shown in FIG. 8C is a first lithium metal layer 800, a first protective layer 810, an electrolyte 820, a second protective layer 830, and a second lithium metal layer 840.

Example 9C: Manufacture of Lithium Metal Battery

A lithium metal battery having a laminate structure as illustrated in FIG. 6 was manufactured in substantially the same manner as in Example 9, except that $LiFePO_4$ was used in place of $LiNi_{0.6}Co_{0.2}Al_{0.2}O_2$, and a protective layer was not on the lithium metal thin film (having a thickness of about 20 μm).

Example 10 to 16: Manufacture of Lithium Metal Batteries

Lithium metal batteries were manufactured in substantially the same manner as in Example 9, except that the negative electrodes of Examples 2 to 8 were used, respectively, in place of the negative electrode of Example 1.

Example 17: Manufacture of Lithium Metal Battery

A lithium metal battery was manufactured in substantially the same manner as in Example 9, except that an electrolyte prepared as follows was used in place of the composite electrolyte prepared in Example 1A.

Poly(styrene-b-divinylbenzene) copolymer microspheres (having an average particle diameter of about 3 μm, available from EPRUI Nanoparticles & Microspheres Co. Ltd.) were added with anhydrous tetrahydrofuran to thereby obtain 5 wt % of a mixture containing the block copolymer.

Polyethylene oxide (PEO) was mixed with acetonitrile to obtain 5 wt % of a PEO acetonitrile solution. To the PEO acetonitrile solution, the mixture containing the block copolymer, lithium bis(fluorosulfonyl) imide (LiFSI, $LiN(SO_2F)_2$), and N-methyl-N-propyl pyrrolidinium bis(fluorosulfonyl)imide (Pyr13FSI), i.e., an ionic liquid, were added to prepare an electrolyte-forming composition.

In the electrolyte-forming composition, the amount of the poly(styrene-b-divinylbenzene) copolymer was about 15 parts by weight, based on 100 parts by weight of PEO. The amount of LiFSI was about 30 parts by weight, based on 100 parts by weight of PEO. The amount of -methyl-N-propyl pyrrolidinium bis(fluorosulfonyl)imide (Pyr13FSI) was about 40 parts by weight, based on 100 parts by weight of PEO.

The electrolyte-forming composition was cast, followed by drying at a temperature of about 40□, to thereby forming an electrolyte.

Example 18: Manufacture of Negative Electrode

A negative electrode was manufactured in substantially the same manner as in Example 1, except that the average particle diameter of poly(styrene-b-divinylbenzene) copolymer microspheres was adjusted to about 50 μm.

Example 19: Manufacture of Negative Electrode

A negative electrode was manufactured in substantially the same manner as in Example 1, except that the poly (styrene-b-divinylbenzene) copolymer microspheres having a mixed weight ratio of the polystyrene block to the polydivinylbenzene block of about 95:5 was used in place of the poly(styrene-b-divinylbenzene) copolymer microspheres having a mixed weight ratio of about 98:2.

Examples 20 and 21: Manufacture of Lithium Metal Batteries

Lithium metal batteries were manufactured in substantially the same manner as in Example 9, except that the negative electrodes of Examples 18 and 19 were used, respectively, in place of the negative electrode of Example 1.

Example 22: Manufacture of Negative Electrode

A negative electrode was manufactured in substantially the same manner as in Example 1, except that a 1:1 mixture (by weight) of poly(styrene-b-divinylbenzene) copolymer microspheres having an average particle diameter of about 3 μm and poly(styrene-b-divinylbenzene) copolymer microspheres having an average particle diameter of about 8 μm was used, in place of using only poly(styrene-b-divinylbenzene) copolymer microspheres having an average particle diameter of about 3 μm.

Example 23: Manufacture of Lithium Metal Battery

A lithium metal battery was manufactured in substantially the same manner as in Example 9 using a negative electrode manufactured in substantially the same manner as in Example 1, except that a 1:1:1 mixture (by weight) of poly(styrene-b-divinylbenzene) copolymer microspheres having particle diameters of about 3 μm, 3.09 μm, and 2.91 μm was used, in place of poly(styrene-b-divinylbenzene) copolymer microspheres having an average particle diameter of about 3 μm.

Example 24: Manufacture of Lithium Metal Battery

A lithium metal battery was manufactured in substantially the same manner as in Example 9 using a negative electrode manufactured in substantially the same manner as in Example 1, except that a 1:1:1 mixture (by weight) of poly(styrene-b-divinylbenzene) copolymer microspheres having particle diameters of about 3 μm, 2.82 μm, and 3.18 μm was used, in place of poly(styrene-b-divinylbenzene) copolymer microspheres having an average particle diameter of about 3 μm.

Example 25: Manufacture of Lithium Metal Battery

A lithium metal battery was manufactured in substantially the same manner as in Example 9 using a negative electrode manufactured in substantially the same manner as in Example 1, except that a 1:1:1 mixture (by weight) of poly(styrene-b-divinylbenzene) copolymer microspheres having particle diameters of about 3 μm, 2.7 μm, and 3.3 μm was used, in place of poly(styrene-b-divinylbenzene) copolymer microspheres having an average particle diameter of about 3 μm.

Example 26: Manufacture of Negative Electrode

A negative electrode was manufactured in substantially the same manner as in Example 1, except that a 9:1 mixture (by weight) of poly(styrene-b-divinylbenzene) copolymer microspheres having an average particle diameter of about 8 µm and poly(styrene-b-divinylbenzene) copolymer microspheres having an average particle diameter of about 3 µm was used, in place of using only poly(styrene-b-divinylbenzene) copolymer microspheres having an average particle diameter of about 3 µm.

Example 27: Manufacture of Negative Electrode

A negative electrode was manufactured in substantially the same manner as in Example 1, except that a 9:1 mixture (by weight) of poly(styrene-b-divinylbenzene) copolymer microspheres having an average particle diameter of about 3 µm and poly(styrene-b-divinylbenzene) copolymer microspheres having an average particle diameter of about 1.3 µm was used, in place of using only poly(styrene-b-divinylbenzene) copolymer microspheres having an average particle diameter of about 3 µm.

Example 28: Manufacture of Negative Electrode

A negative electrode was manufactured in substantially the same manner as in Example 1, except that the mixture containing the composite particles was prepared using the composite particles prepared in Preparation Example 4 in place of the composite particles prepared in Preparation Example 1.

Comparative Example 1: Manufacture of Lithium Metal Battery $LiNi_{0.6}Co_{0.2}Al_2O_2$(NCA), a conductive agent (Super-P; available from Timcal Ltd.), polyvinylidene fluoride (PVdF), and N-methylpyrrolidone were mixed together to prepare a positive active material-forming composition. In the positive active material layer-forming composition, the mixed weight ratio of $LiCoO_2$ to the conductive agent to PVDF was about 97:1.5:1.5.

The positive active material layer-forming composition was coated on an aluminum foil (having a thickness of about 15 µm), and then dried at a temperature of 25□. Next, the resultant was dried under vacuum at a temperature of about 110? to manufacture a positive electrode.

A polyethylene separator (having a porosity of about 48%) was disposed between the thus manufactured positive electrode and a lithium metal negative electrode (having a thickness of about 20 µm), thereby completing the manufacture of a lithium metal battery. In the battery, a liquid electrolyte was added between the positive electrode and the lithium metal negative electrode.

The liquid electrolyte was an electrolyte including 1.0 M $LiN(SO_2F)_2$ (LiFSI) in a mixed solvent of 1,2-dimethoxyethane (DME) and 1,1,2,2-tetrafluoroethyl 2,2,3,3-tetrafluoropropyl ether (TTE) in a volume ratio of about 2:8.

Comparative Example 2: Manufacture of Negative Electrode

Polystyrene was added to anhydrous tetrahydrofuran to prepare 5 wt % of a mixture containing polystyrene. The weight average molecular weight of polystyrene was about 100,000 Daltons.

The mixture was added with lithium bis(fluorosulfonyl) imide (LiFSI, $LiN(SO_2F)_2$) to thereby obtain a protective layer-forming composition. In this protective layer-forming composition, the amount of LiFSI was about 30 parts by weight, based on 100 parts by weight of polystyrene.

The thus prepared protective layer-forming composition was coated on a lithium metal thin film (having a thickness of about 20 µm) to a thickness of about 3 µm using a doctor blade.

The coated resultant was dried at a temperature of about 25□, and thermally treated in a vacuum at a temperature of about 40□ for 24 hours, to thereby complete the manufacture of a negative electrode with a protective layer on the lithium metal thin film.

Comparative Examples 3 and 4: Manufacture of Negative Electrodes

Protective layers and negative electrodes were manufactured in substantially the same manner as in Example 1, except that the average particle diameters of poly(styrene-b-divinylbenzene) copolymer microspheres were adjusted to about 1 µm and 0.2 µm, respectively, in the preparation of the protective layer-forming composition.

Evaluation Example 1: Transmission Electron Microscope (TEM) Analysis

Figure 2A:
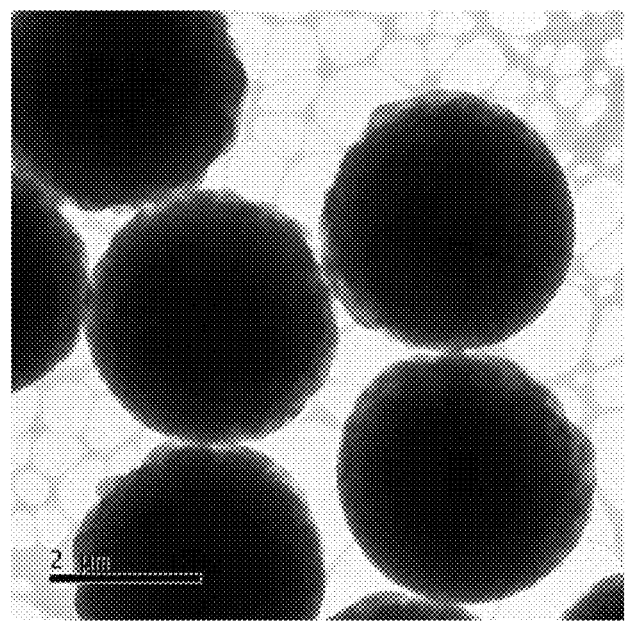
FIGS. 2A and 2B are each a transmission electron microscope (TEM) image of the composite particle included in the protective layer of Example 1.
Figure 2B:
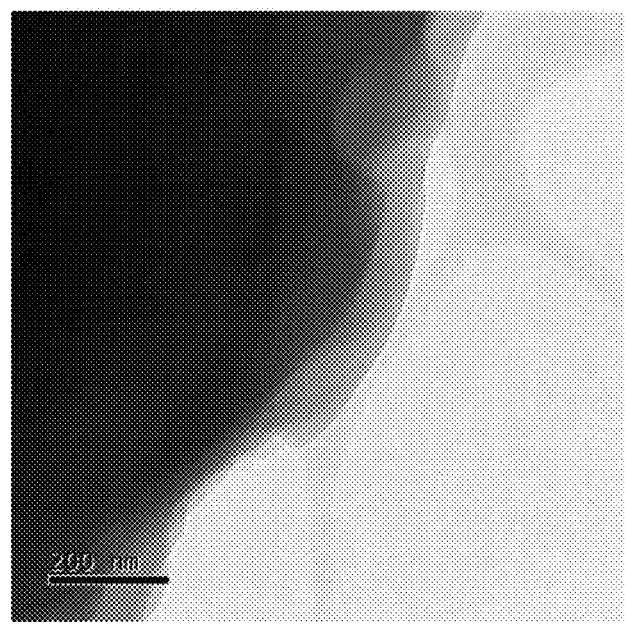
Figure 2C:
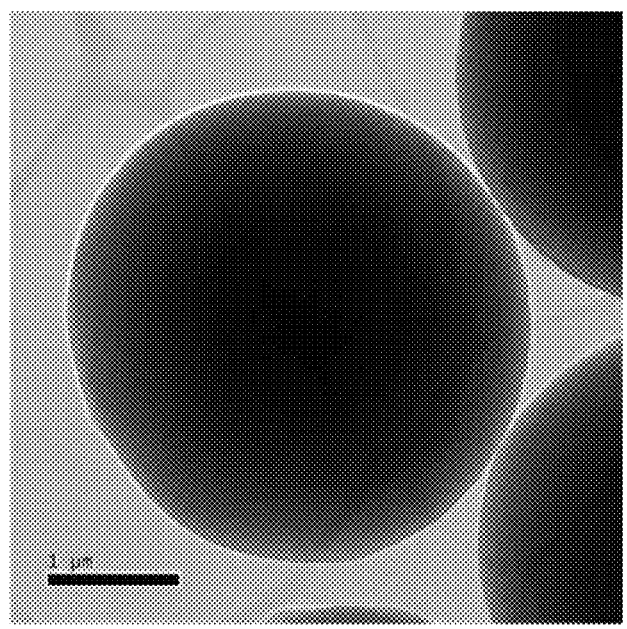
FIG. 2C is a TEM image of a poly(styrene-b-divinylbenzene) block copolymer microsphere, which is a starting material for the composite particle in Preparation Example 1, for comparison with the composite particles of FIG. 2A and FIG. 2B.

The protective layer prepared in Example 1 was analyzed using a TEM. Upon the TEM analysis, Titan cubed 60-300 (available from FEI Co., Ltd.) was used as an analyzer, and the results of the TEM analysis are shown in FIGS. 2A to 2C. FIGS. 2A and 2B are each a TEM image of the composite particles in the protective layer of Example 1. FIG. 2C, for comparison with the composite particles of FIGS. 2A and 2B, is a TEM image of a poly(styrene-b-divinylbenzene) microsphere (having an average particle diameter of about 3 µm), i.e., a starting material for the composite particles in Preparation Example 1.

Referring to FIGS. 2A to 2C, the composite particles in the protective layer of Example 1 were found to have a continuous coating layer having a thickness of about 100 nm on the particle surface, i.e., a core-shell microsphere structure.

Evaluation Example 2: Scanning Electron Microscope (SEM) Analysis

The surface of the negative electrode prepared in Example 1 was analyzed using a SEM. SU-8030 (available from Hitachi Co., Ltd.) was used as a SEM. The SEM image of the negative electrode manufactured in Example 1 is shown in FIG. 2D.

Figure 2D:
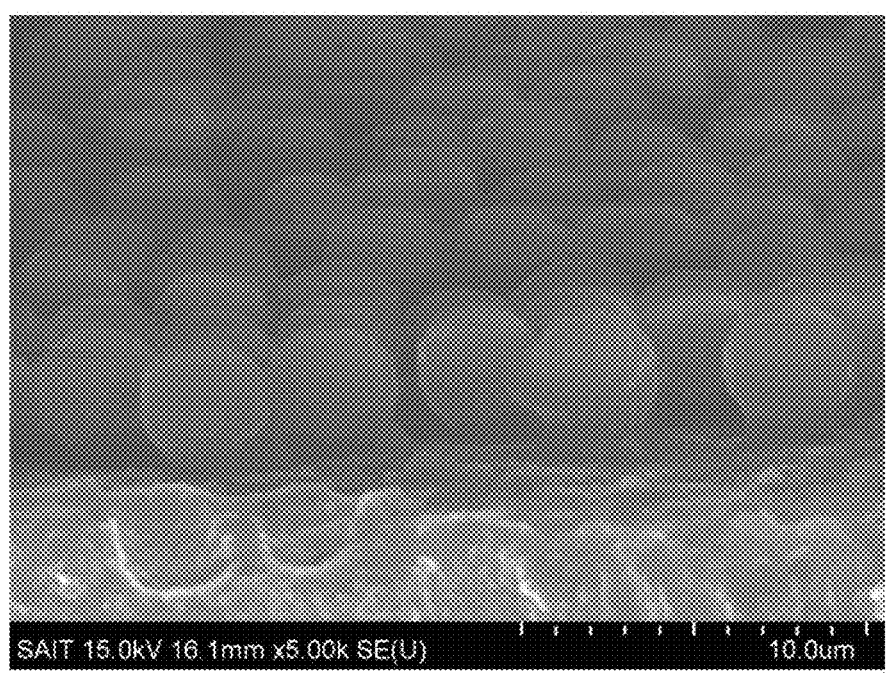
FIG. 2D is a scanning electron microscope (SEM) image of the negative electrode prepared in Example 1.

Referring to FIG. 2D, the protective layer is stacked on the surface of the lithium negative electrode, and the composite particles are evenly arranged and interconnected to one another.

Evaluation Example 3: Lithium Deposition Density and SEM Analysis

1) Example 9, Comparative Example 1

Each of the lithium metal batteries manufactured in Example 9, and Comparative Example 1 was charged with a constant current of 0.1 C rate (0.38 mA/cm$^2$) at a temperature of about 25□ until a voltage of about 4.40 V (vs. Li), and maintained at a constant voltage of 4.40 V (constant voltage mode) until a cutoff current of 0.05 C rate. This one-time charging was followed by measuring external pouch thickness in the lithium metal batteries with a micrometer. The results thereof are shown in Table 1. In addition, the thickness of the lithium deposition layer on the negative electrode was measured to thereby obtain the results of deposition density evaluation, which are shown in Table 1.

TABLE 1

| Classification | Change in external pouch thickness (μm) | Lithium deposition density (g/cc, g/cm³) |
|---|---|---|
| Example 9 | 18-23 | 0.33-0.36 |
| Comparative Example 1 | 50-60 | 0.134-0.161 |

Referring to Table 1, the lithium metal battery of Example 9 was found to have less change in the external pouch thickness than those of Comparative Example 1, and to have an increased thickness uniformity at different measurement points. In addition, the lithium metal battery of Example 9 was found to have an increased lithium deposition density, as compared with that of Comparative Example 1.

2) High Rate Characteristics (0.5 C)

Figure 3A:
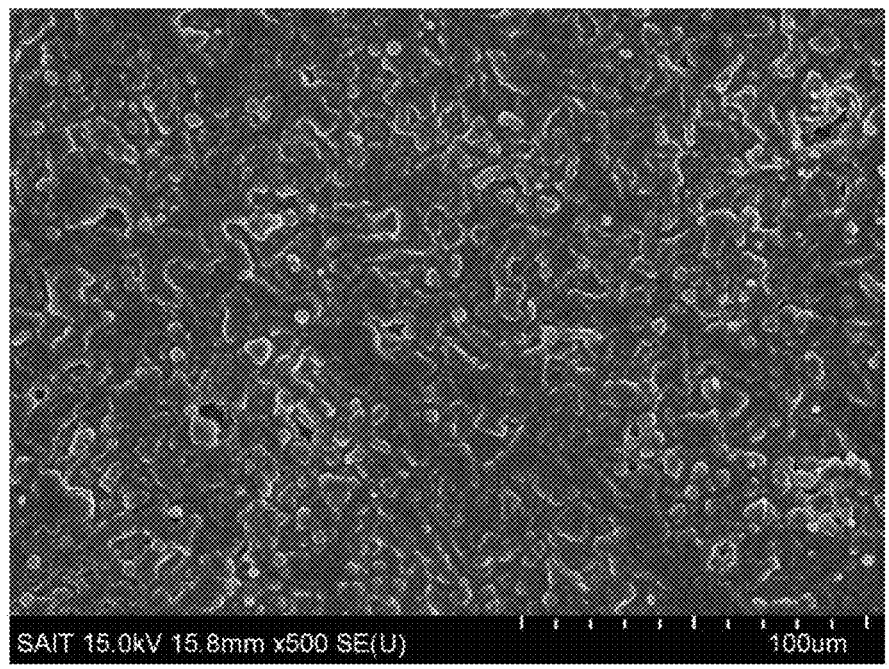
FIGS. 3A and 3B are each a SEM image of the lithium metal battery prepared in Example 9.
Figure 3B:
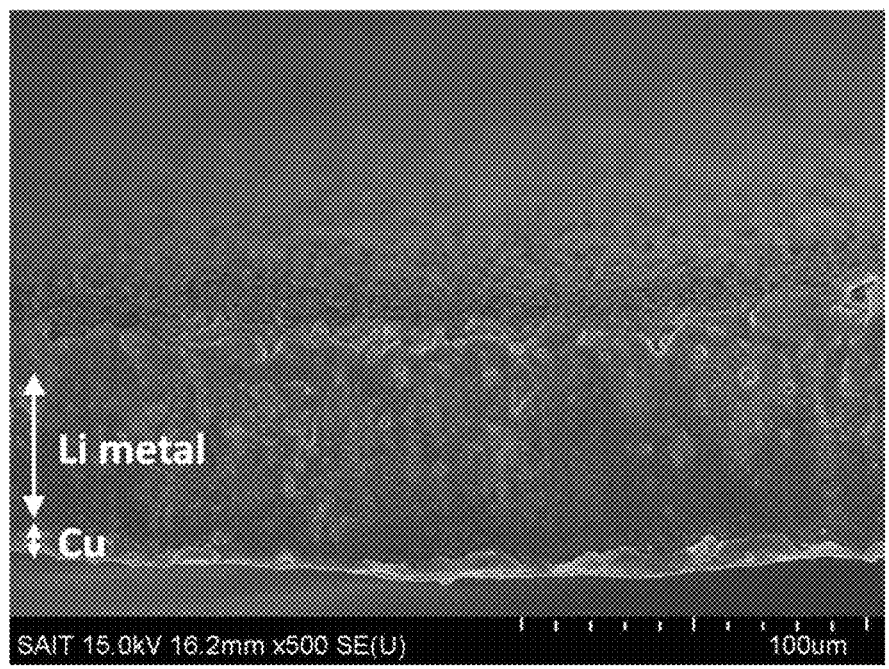
Figure 3C:
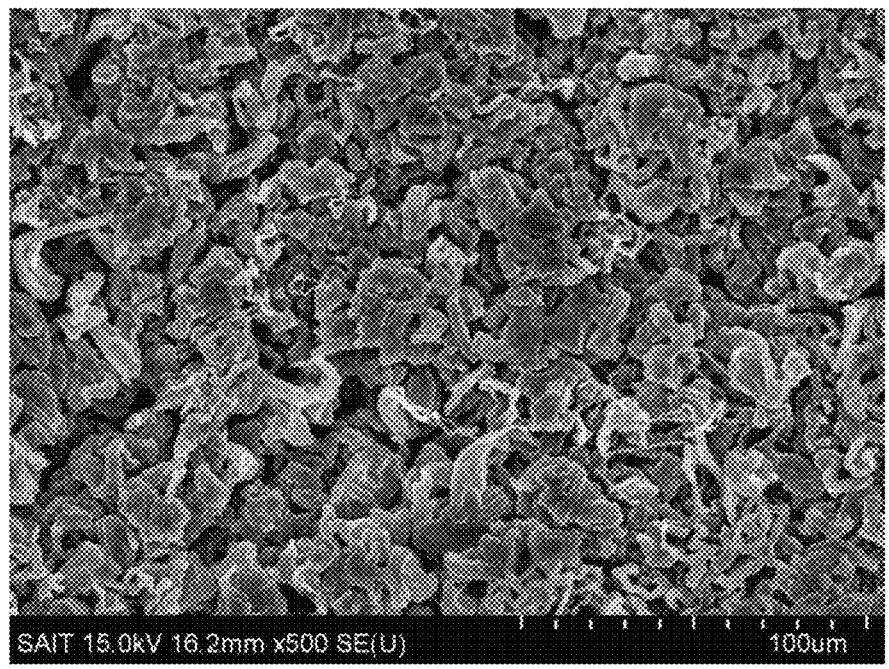
FIGS. 3C and 3D are each a SEM image of the lithium metal battery prepared in Comparative Example 1.
Figure 3D:
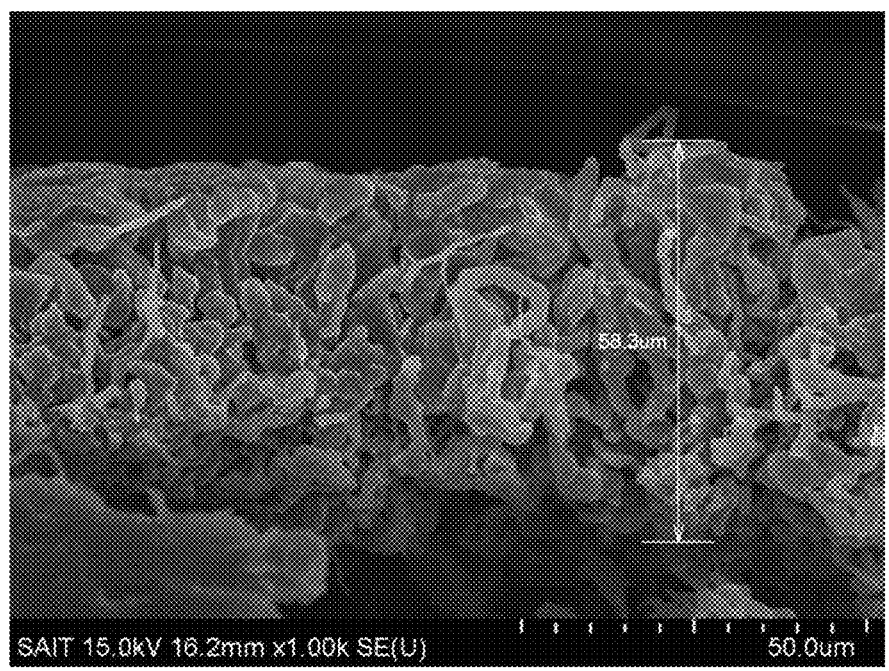

Each of the lithium metal batteries manufactured in Example 9 and Comparative Example 1 was charged with a constant current of 0.5 C rate at a temperature of about 25☐ for 2 hours until a voltage of about 4.40 V (vs. Li) was reached. Then, The morphology of a lithium deposition layer of the lithium metal negative electrodes was analyzed using SEM of the cross-section status of the lithium metal negative electrodes, on which the lithium deposition layer was formed. FIGS. 3A and 3B are the SEM images of the lithium metal battery of Example 9. FIGS. 3C and 3D are the SEM images of the lithium metal battery of Comparative Example 1.

The foregoing one-time charging was followed by measuring external pouch thickness in the lithium metal batteries with a micrometer. As a result, the lithium metal battery of Example 9 was found to have a change in external pouch thickness, after charging with 0.5 C, of about 15 μm. Thus, it was found that the lithium metal battery of Example 9 had a small volume expansion. In addition, the deposition density of the lithium metal battery of Example 9 was about 0.4 g/cm³ or greater. In this regard, the lithium metal battery of Comparative Example 1 was found to have a change in external pouch thickness, after charging with 0.5 C, of about 60 μm, and the deposition density thereof was about 0.13 g/cm³.

3) Example 9C

The lithium metal battery manufactured in Example 9C, as in substantially the same manner as in Example 9 and Comparative Example 1, was charged with a constant current of 0.1 C rate (0.38 mA/cm²) at a temperature of about 25☐ until a voltage of about 4.40 V (vs. Li), and maintained at a constant voltage of 4.40 V (constant voltage mode) until a cutoff current of 0.05 C rate. This one-time charging was followed by measuring the thickness of the lithium deposition layer on the negative electrode to thereby obtain the results of deposition density evaluation, which are shown in Table 2.

TABLE 2

| Classification | Lithium deposition density (g/cc, g/cm³) |
|---|---|
| Example 9C | 00.44-0.48 |

Referring to Table 2, the lithium metal battery of Example 9C was found to have a good lithium deposition density.

Evaluation Example 4: Charging and Discharging Characteristics (Cell Lifespan)

1) Examples 9 and 9A

Each of the lithium metal batteries manufactured in Example 9 and Example 9A was charged with a constant current of 0.1 C rate at a temperature of about 25☐ until a voltage of about 4.40 V (vs. Li), and maintained at a constant voltage of 4.40 V (constant voltage mode) until a cutoff current of 0.05 C rate. Afterward, the batteries were discharged with a constant current of 0.1C rate until the voltage reached 2.8 V (vs. Li) (Formation process, 1st cycle). Formation process was completed by repeating the charging and discharging two more times.

The lithium metal batteries that went through the formation process were charged with a constant current of 0.7 C rate at room temperature (25☐) until the voltage reached 4.4 V (vs. lithium metal). Afterward, the batteries were discharged with a constant current of 0.5 C rate until the voltage reached a cut-off voltage of 4.4 V.

The same charging and discharging process was repeated 99 times to perform total 300 times of charging and discharging cycles. The capacity retention was calculated by following the Equation 1.

Capacity retention (%)=(100$^{th}$ cycle discharge capacity/1$^{st}$ cycle discharge capacity)×100%      Equation 1

Figure 4:
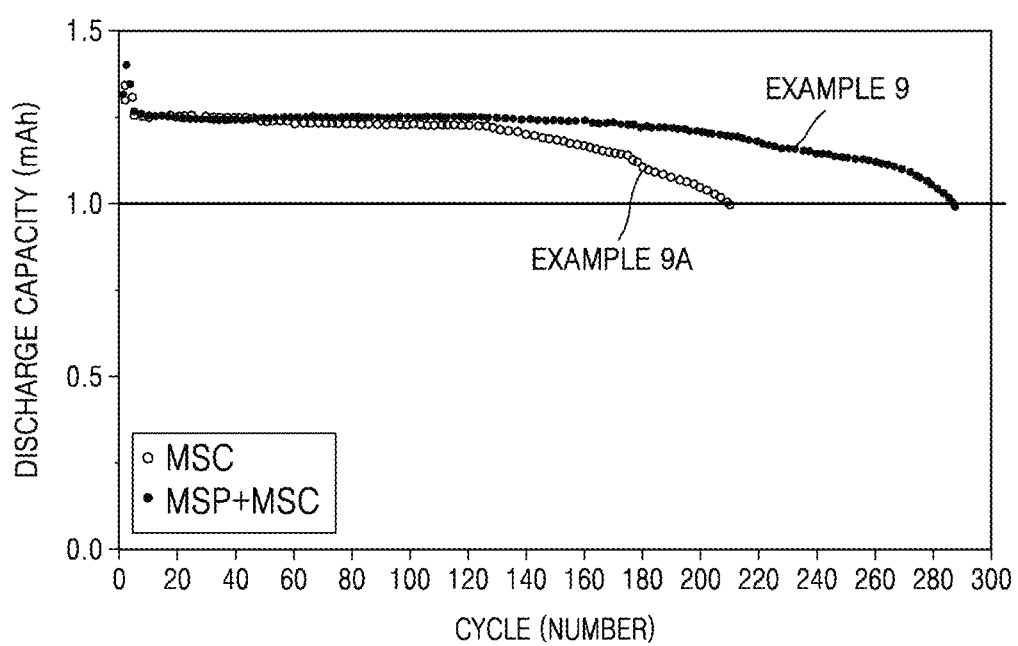
FIG. 4 is a graph of discharge capacity (milliampere-hours, mAh) versus cycle number, illustrating the cell lifespan of the lithium metal batteries prepared in Examples 9 and 9A.

The evaluation results of the capacity retention rate are shown in FIG. 4. In FIG. 4, "MSC" stands for Example 9A, and "MSP+MSC" stands for Example 9.

Referring to FIG. 4, the lithium metal batteries of Examples 9 and 9A were found to have excellent capacity retention rate.

Evaluation Example 5: Lithium Deposition Simulation

Lithium deposition simulation was performed on the negative electrodes of Examples 1 and 28 using COMSOL Multiphysics modeling package software. The thickness of the coating layer on the surface of the composite particles in the protective layer of the negative electrode of Example 1 was about 100 nm. The thickness of the coating layer on the surface of the composite particles in the protective layer of the negative electrode of Example 28 was about 200 nm.

Figure 7A:
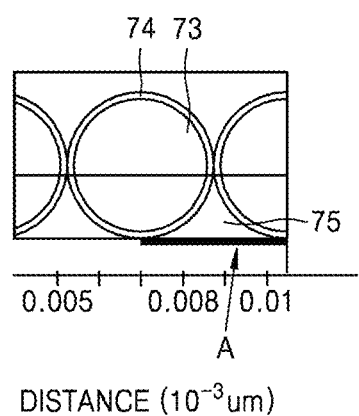
Figure 7B:
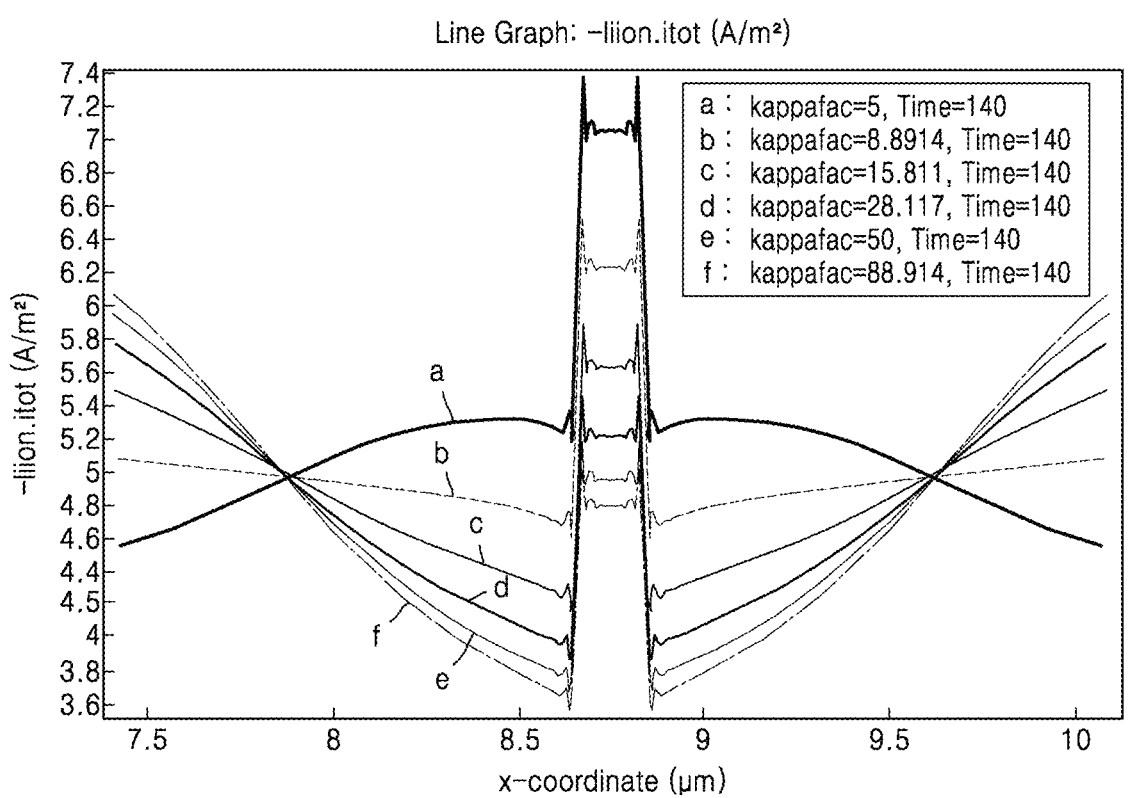
Figure 7C:
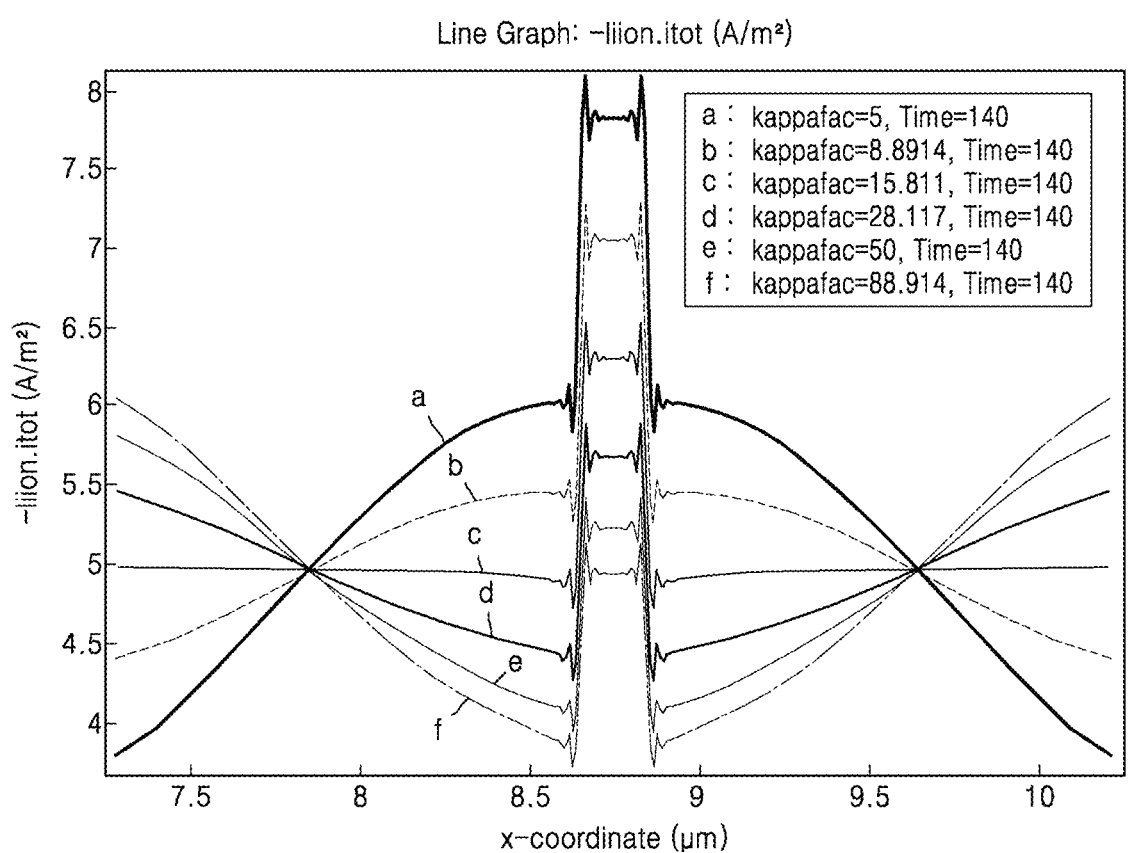

The analysis results are shown in FIGS. 7A to 7C.

FIG. 7A illustrates the arrangement of the composite particles having a coating layer (shell) having a thickness of about 200 nm on the surface of the particles (having a particle diameter of about 3 μm) on the lithium metal of the negative electrode of lithium deposition simulation the Example 28. FIGS. 7B and 7C illustrate the analysis results of lithium deposition simulation, in which the thickness of the coating layers in the composite particles were about 200 nm and 100 nm, respectively. In FIG. 7A, a coating layer 74 is disposed on a particle 73 to form a composite particle, and a crosslinked material of an oligomer 75 is disposed between the particles 73. In FIG. 7A, "A" indicates the defect position where a dendritic growth may occur. In FIG. 7b. liion.itot means Li ion, i (current) tot (total), which means a total Li ion current density.

In FIGS. 7B and 7C, "kappafac" ($k_{shell}/k_{oligomer}$) indicates the conductivity of the coating layer/the conductivity of the oligomer, wherein, "$k_{oligoomer}$" indicates the conductivity of the crosslinked material of the oligomer (DEGDA) in the protective layer, and "$k_{shell}$" indicates the conductivity of the coating layer of the composite particle. The x-axis indicates the distance (gap) between the composite particles, and the y-axis indicates the current density of the protective layer.

Referring to FIG. 7B, when kappafac>25, it was found that the current density of the "A" portion in FIG. 7A increased, which results in uniform current distribution. Referring to FIG. 7C, when kappafac>50, it was found that the current density of the "A" portion in FIG. 7A increased, which results in uniform current distribution, even in the case of the 100 nm coating layer of the composite particle.

Evaluation Example 6: Interfacial Resistance

1) Example 9C and Comparative Example 1

The resistance of each of the lithium metal batteries of Example 9C and Comparative Example 1 measured by using an impedance analyzer (Solartron 1260A Impedance/Gain-Phase Analyzer) at a temperature of about 25□, according to the 2-probe method. The amplitude was about ±10 millivolts (mV), and the frequency range was in a range of about 0.1 Hertz (Hz) to about 1 mega Hertz (MHz).

Nyquist plots obtained from the impedance measurements that were performed after 24 hours from the manufacture of the lithium metal batteries of Example 9 and Comparative Example 1 are shown in FIG. 8A. Referring to FIG. 8A, the interfacial resistance of the negative electrode and the electrolyte may be determined by the position and size of the semicircle.

As shown in FIG. 8A, it was found that the interfacial resistance of the lithium metal battery of Example 9C was about 20% or greater lower than that of the lithium metal battery of Comparative Example 1.

2) Example 9B

The impedance measurements were performed on the lithium metal battery of Example 9B, as in substantially the same manner as in the measurement of the interfacial resistance of the lithium metal battery of Example 9C. Nyquist plots obtained from the impedance measurements that were performed after 24 hours from the manufacture of the lithium metal battery of Example 9B is shown in FIG. 8B.

As shown in FIG. 8B, it was found that the interfacial resistance of the negative electrode and the electrolyte in the lithium metal battery of Example 9B was lower.

Evaluation Example 7: Tensile Modulus

1) Example 1 and Comparative Example 2

The protective layer-forming composition prepared in in Example 1 and Comparative Example 2 were cast on a member, and THF in the resultant was gradually evaporated in an argon glove box for 24 hours at a temperature of about 25° C., and subsequently, under vacuum at a temperature of 25° C., the result was dried for 24 hours to prepare a protective film in the form of a film. The thickness of the protective film was about 20 μm.

The tensile modulus of the prepared protective layer was measured using DMA800 (available from TA Instruments Inc.). The protective layer samples for the tensile modulus measurement were prepared according to the ASTM standard D412 (Type V specimens). The tensile modulus is also known as Young's modulus.

Variations in strain with respect to stress in the protective layer was measured at a temperature of about 25° C., a relative humidity of about 30%, and a rate of 5 mm/min. The tensile modulus was calculated from the slope of a stress-strain curve thereof.

As a result, the protective layer prepared in Example 1 was found to have a tensile modulus of $1\times10^8$ Pa or greater, which is improved over that of the protective layer prepared in Comparative Example 2. Accordingly, when the protective layer of Example 1 is used, the volumetric change of the lithium metal negative electrode and lithium dendritic growth may be effectively suppressed.

2) Example 1

The tensile modulus of the composite particles prepared in Preparation Example 1 used In Example 1 was measured using DMA800 (available from TA Instruments Inc.).

As a result, the composite particles prepared in Preparation Example 1 was found to have a tensile modulus of 3.9 GPa.

Aside from the foregoing process, diethylene glycol diacrylate (DEGDA) and 2-hydroxy-2-methylpropiophenon (HMPP) was dissolved in tetrahydrofuran to prepare 30 wt % of a DEGDA solution. This solution was cast on a quartz substrate and dried resultant. Next, the cast resultant was dried at a temperature of about 25□ for 12 hours, followed by irradiation with ultraviolet (UV) light at a temperature of about 40□ for 1 hour, thereby completing the manufacture of a film including a crosslinked material of diethylene glycol diacrylate (DEGDA).

The tensile modulus of the film including a crosslinked material of diethylene glycol diacrylate (DEGDA) was measured using DMA800 (available from TA Instruments Inc.).

As a result, the film was found to have a tensile modulus of 500 MPa at 35° C.

As described above, according to one or more embodiments, a negative electrode for a lithium metal battery may include a protective layer with improved uniform current density and lithium ion mobility upon lithium deposition. When this negative electrode is used, a lithium metal battery with an effectively suppressed volumetric change during charging and improved cycle lifespan and discharge capacity may be manufactured.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A negative electrode for a lithium metal battery, the negative electrode comprising:

a lithium metal layer comprising lithium metal or a lithium metal alloy; and a protective layer on at least a portion of the lithium metal layer, wherein the protective layer comprises a plurality of composite particles having a particle size of greater than about 1 micrometer to about 100 micrometers, wherein the plurality of composite particles comprises an organic particle comprising a polymer comprising polystyrene, a copolymer comprising a styrene repeating unit, a copolymer comprising a divinylbenzene repeating unit, or a combination thereof; and a coating layer disposed on a surface of the organic particle, the coating layer comprising an ion conductive material, wherein the ion conductive material comprises polyethylene glycol, polypropylene glycol, poly(ethylene glycol-co-propylene glycol-co-ethylene glycol), poly(propylene glycol-co-ethylene glycol-co-propylene glycol), polysiloxane, poly(oxyethylene) methacrylate, poly(ethylene glycol)diacrylate, poly(propylene glycol)diacrylate, poly(ethylene glycol) dimethacrylate, poly(propylene glycol) dimethacrylate, poly(ethylene glycol)urethane diacrylate, poly(ethylene glycol)urethane dimethacrylate, polyester diacrylate, polyester dimethacrylate, poly(ethylene glycol) urethane triacrylate, poly(ethylene glycol) urethane trimethacrylate, a polymer derived from trimethylolpropane triacrylate and trimethylolpropane trimethacrylate, poly(ethylene oxide) grafted poly(methyl methacrylate), poly(propylene oxide) grafted poly(methyl methacrylate), poly(butylene oxide) grafted poly(methyl methacrylate), polysiloxane grafted poly(methyl methacrylate), poly(ethylene glycol) grafted poly(methyl methacrylate), poly(propylene glycol) grafted poly(methyl methacrylate), or a combination thereof.

2. The negative electrode of claim 1, wherein the protective layer has a Young's modulus of about $10^6$ Pascals to about $10^{11}$ Pascals.

3. The negative electrode of claim 1, wherein the ion conductive material comprises polyethylene glycol.

4. The negative electrode of claim 1, wherein a weight average molecular weight of the ion conductive material is in a range of about 200 to about 100,000 Daltons.

5. The negative electrode of claim 1, wherein a thickness of the coating layer is about 0.2 micrometer to about 1 micrometer.

6. The negative electrode of claim 1, wherein an amount of the ion conductive material in the coating layer is in a range of about 10 parts to about 50 parts by weight, based on 100 parts by weight of the particle.

7. The negative electrode of claim 1, wherein the protective layer further comprises a crosslinked material of a polymerizable oligomer present between the composite particles.

8. The negative electrode of claim 7, wherein the polymerizable oligomer is diethylene glycol diacrylate, triethylene glycol diacrylate, tetraethylene glycol diacrylate, polyethylene glycol diacrylate, dipropylene glycol diacrylate, tripropylene glycol diacrylate, ethoxylated trimethylolpropane triacrylate, acrylate-functionalized ethylene oxide, 1,6-hexanediol diacrylate, ethoxylated neopentyl glycol diacrylate, propoxylated neopentyl glycol diacrylate, allyl methacrylate, trimethylol propane triacrylate, trimethylol propane trimethacrylate, pentaerythritol triacrylate, ethoxylated/propoxylated trimethylolpropane tri acrylate, propoxylated glyceryl triacrylate, tris(2-hydroxyethyl) isocyanurate triacrylate, pentaerythritol tetraacrylate, and dipentaerythritol pentaacrylate, wherein an amount of the crosslinked material of the polymerizable oligomer is in a range of about 10 parts to about 50 parts by weight, based on 100 parts by weight of the particle.

9. The negative electrode of claim 1, wherein the protective layer further comprises a lithium salt, or a liquid electrolyte comprising a lithium salt and an organic solvent.

10. The negative electrode of claim 9, wherein the lithium salt is LiSCN, $LiN(CN)_2$, $LiClO_4$, $LiBF_4$, $LiAsF_6$, $LiPF_6$, $LiCF_3SO_3$, $LiC(CF_3SO_2)_3$, $LiN(SO_2C_2F_5)_2$, $LiN(SO_2CF_3)_2$, $LiN(SO_2F)_2$, $LiSbF_6$, $LiPF_3(CF_2CF_3)_3$, $LiPF_3(CF_3)_3$, $LiB(C_2O_4)_2$, or a combination thereof, and the organic solvent comprises ethylene carbonate, propylene carbonate, dimethyl carbonate, diethyl carbonate, ethyl methyl carbonate, fluoroethylene carbonate, gamma-butyrolactone, 1,2-dimethoxyethane, 1,2-diethoxyethane, diethylene glycol dimethyl ether, triethylene glycol dimethyl ether, tetraethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, or a combination thereof.

11. The negative electrode of claim 1, wherein the polymer is polystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) acrylate-acrylonitrile-butadiene-styrene) copolymer, a poly((C1-C9 alkyl) methacrylate-butadiene-styrene) copolymer, a poly((C1-C9) alkyl acrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination thereof.

12. The negative electrode of claim 1, wherein the copolymer comprising the divinylbenzene repeating unit comprises a block copolymer comprising a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, or a combination thereof; and the copolymer comprising the styrene repeating unit comprises a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) acrylate-acrylonitrile-butadiene-styrene) copolymer, a poly((C1-C9 alkyl) methacrylate-butadiene-styrene) copolymer, a poly((C1-C9) alkyl acrylate-butadiene-styrene) copolymer, a poly(styrene-(C1-C9 alkyl) acrylate) copolymer, a poly(acrylonitrile-styrene-(C1-C9 alkyl) acrylate) copolymer, or a combination of one of the foregoing units.

13. The negative electrode of claim 1, wherein the protective layer is a single layer or multiple layers comprising a particle, and wherein the protective layer comprises particles having different particle sizes.

14. The negative electrode of claim 1, wherein the organic particle is a microsphere having an average particle diameter in a range of about 1.1 micrometer to about 50 micrometers.

15. The negative electrode of claim 1, wherein the organic particle comprises a poly(styrene-co-divinylbenzene) copolymer microsphere having an average particle diameter of about 3 micrometers and a poly(styrene-co-divinylbenzene) copolymer microsphere having an average particle diameter of about 8 micrometers; a poly(styrene-co-divinylbenzene) copolymer microsphere having an average particle diameter of about 3 micrometers and a poly(styrene-co-divinylbenzene) copolymer microsphere having an average particle diameter of about 1.3 micrometers; or a poly(styrene-co-divinylbenzene) copolymer microsphere having an average particle diameter of about 3 micrometers and a poly(styrene-co-divinylbenzene) copolymer microsphere having an average particle diameter of about 1.1 micrometers.

16. The negative electrode of claim 1, wherein the coating layer is disposed on the surface of the organic particle as an independent phase while maintaining a porous structure formed between the plurality of composite particles in the protective layer.

17. The negative electrode of claim 1, wherein a porosity of the protective layer is in a range of about 25% to about 50%, and a thickness of the protective layer is in a range of about 1 micrometer to about 10 micrometers.

18. A lithium metal battery comprising:
a positive electrode;
the negative electrode of claim 1; and
an electrolyte between the positive electrode and the negative electrode.

19. The lithium metal battery of claim 18, wherein during charge of the lithium metal battery a lithium layer is disposed on the negative electrode, and a lithium density of the lithium layer is in a range of about 0.2 grams per cubic centimeter to about 0.5 grams per cubic centimeter.

20. The lithium metal battery of claim 19, wherein a thickness of the lithium layer is 18 micrometers to about 40 micrometers or less.

21. The lithium metal battery of claim 18, wherein the electrolyte comprises a liquid electrolyte, a solid electrolyte, a gel electrolyte, a polymeric ionic liquid, or a combination thereof.

22. The lithium metal battery of claim 18, further comprising a separator.

23. The lithium metal battery of claim 18, further comprising a separator, wherein the electrolyte is a liquid electrolyte, and the lithium metal battery has a stack structure in which the negative electrode, the separator, the liquid electrolyte, and the positive electrode are sequentially stacked upon one another in this stated order.

24. A method of manufacturing the negative electrode for a lithium metal battery of claim 1, the method comprising:
mixing the plurality of composite particles with a solvent to form a protective layer-forming composition;
coating the protective layer-forming composition on the lithium metal layer; and
drying the protective layer-forming composition to form a protective layer to thereby manufacture the negative electrode for a lithium metal battery of claim 1,
wherein the plurality of composite particles comprises
an organic particle having a particle size of greater than about 1 micrometer to about 100 micrometers or less, wherein the organic polymer comprises a polymer comprising polystyrene, a copolymer comprising a styrene repeating unit, a copolymer comprising a divinylbenzene repeating unit, or a combination thereof, and
a coating layer disposed on a surface of the organic particle and comprising an ion conductive material,
wherein the ion conductive material comprises polyethylene glycol, polypropylene glycol, poly(ethylene glycol-co-propylene glycol-co-ethylene glycol), poly(propylene glycol-co-ethylene glycol-co-propylene glycol), polysiloxane, poly(oxyethylene)methacrylate, poly(ethylene glycol)diacrylate, poly(propylene glycol)diacrylate, poly(ethylene glycol)dimethacrylate, poly(propylene glycol)dimethacrylate, poly(ethylene glycol) urethane diacrylate, poly(ethylene glycol)urethane dimethacrylate, polyester diacrylate, polyester dimethacrylate, poly(ethylene glycol) urethane triacrylate, poly(ethylene glycol) urethane trimethacrylate, a polymer derived from trimethylolpropane triacrylate and trimethylolpropane trimethacrylate, poly(ethylene oxide) grafted poly(methyl methacrylate), poly(propylene oxide) grafted poly(methyl methacrylate), poly(butylene oxide) grafted poly(methyl methacrylate), polysiloxane grafted poly(methyl methacrylate), poly(ethylene glycol) grafted poly(methyl methacrylate), poly(propylene glycol) grafted poly(methyl methacrylate), or a combination thereof.

* * * * *